United States Patent [19]

Nonura

[11] Patent Number: 4,853,971

[45] Date of Patent: Aug. 1, 1989

[54] METHOD AND APPARATUS FOR PROCESSING IMAGE DATA

[75] Inventor: Akihiro Nonura, Osaka, Japan

[73] Assignee: Dainippon Screen Mfg. Co., Ltd., Kyoto, Japan

[21] Appl. No.: 838,553

[22] Filed: Mar. 11, 1986

[30] Foreign Application Priority Data

| | | | |
|---|---|---|---|
| Mar. 18, 1985 | [JP] | Japan | 60-55503 |
| Aug. 15, 1985 | [JP] | Japan | 60-180200 |

[51] Int. Cl.[4] ........ G06K 9/36

[52] U.S. Cl. ........ 382/56; 382/22; 382/25

[58] Field of Search ........ 340/747; 382/26, 56, 382/25, 22; 358/263

[56] References Cited

U.S. PATENT DOCUMENTS

| | | | |
|---|---|---|---|
| 3,268,864 | 8/1966 | Kubo | 382/26 |
| 3,890,596 | 6/1975 | Beun | 382/26 |
| 4,110,736 | 8/1978 | Kono | 382/25 |
| 4,115,806 | 9/1978 | Morton | 382/23 |
| 4,206,441 | 6/1980 | Kondo | 382/2 |
| 4,327,354 | 4/1982 | Persoon | 382/22 |
| 4,334,274 | 6/1982 | Agui | 382/9 |
| 4,425,559 | 1/1984 | Sherman | 340/747 |
| 4,545,070 | 10/1985 | Miyagawa | 382/48 |
| 4,550,434 | 10/1985 | Shimada | 382/61 |
| 4,555,801 | 11/1985 | Miyagawa | 382/44 |
| 4,594,673 | 6/1986 | Holly | 340/734 |
| 4,603,431 | 7/1986 | Grover | 382/56 |
| 4,626,838 | 12/1986 | Tsujioka | 340/747 |
| 4,631,690 | 12/1986 | Corthout | 340/747 |
| 4,646,078 | 2/1987 | Knierim | 340/747 |
| 4,698,779 | 10/1987 | Holden | 340/747 |
| 4,736,443 | 4/1988 | Miyagawa | 382/48 |

*Primary Examiner*—Leo H. Boudreau
*Assistant Examiner*—Jose L. Couso
*Attorney, Agent, or Firm*—Lowe, Price, LeBlanc, Becker & Shur

[57] ABSTRACT

On the basis of vertex coordinates of polygons to be recorded, mode data is provided for every segment forming the polygons. The mode data includes mode data as to whether points on the segment are in a raster start point mode, a raster end point mode or a raster start and end point mode. The mode data of the respective segments are accumulated in correspondence with recording coordinates and stored in a memory. The accumulated mode data are read from the memory and sequentially accumulated along scanning lines to provide raster outputs.

25 Claims, 28 Drawing Sheets

FIG.10
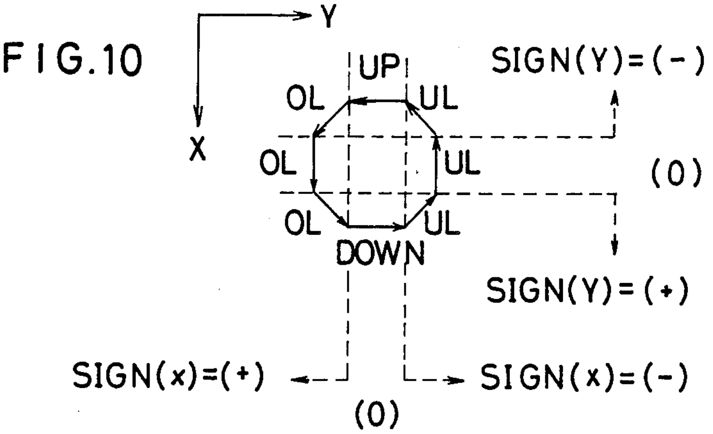
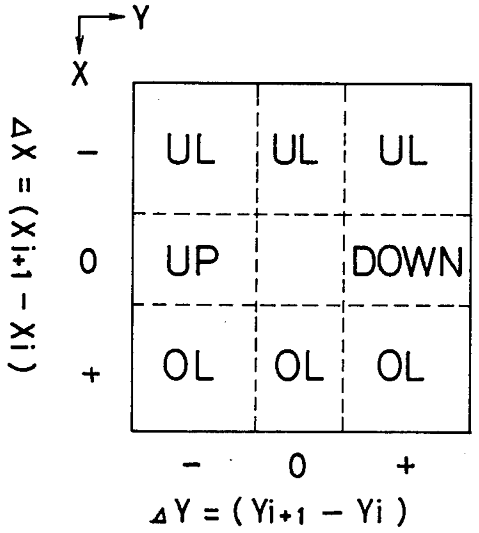
FIG.11
FIG.12
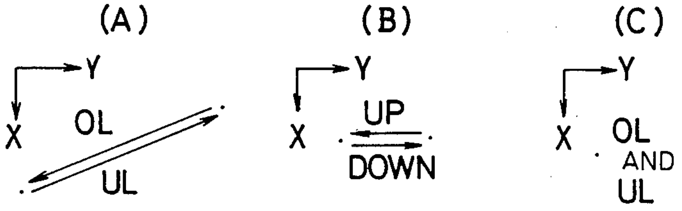

| "MODE 1" TRANSFORM. | | "MODE 2" TRANSFORM. | |
|---|---|---|---|
| 000 → 001 | | 000 → 111 | |
| 001 → 010 | | 001 → 100 | |
| 010 → 011 | | 010 → 001 | |
| 100 → 001 | | 011 → 010 | |
| 101 → 110 | | 100 → 111 | |
| 110 → 111 | | 110 → 101 | |
| 111 → 100 | | 111 → 110 | |

|    | $\ell_1$ | $\ell_2$ |    | $\ell_3$ |
|----|----------|----------|----|----------|
|    | (001)    | (111)    |    | (100)    |

|    | $m_1$ |    | $m_2$ | $m_3$ |
|----|-------|----|-------|-------|
|    | (001) |    | (100) | (111) |

|    | $n_1$ |    | $n_2$ | $n_3$ |
|----|-------|----|-------|-------|
|    | (010) |    | (111) | (111) |

(A)

| ANTILOCKWISE ROTATION | | |
|---|---|---|
| ΔX | ΔY | G($\overline{P_i P_{i+1}}$) |
| + | | 2 |
| 0 | + | 1 |
| 0 | − | 3 |
| − | | 4 |

(B)

| CLOCKWISE ROTATION | | |
|---|---|---|
| ΔX | ΔY | G($\overline{P_i P_{i+1}}$) |
| + | | 4 |
| 0 | + | 1 |
| 0 | − | 3 |
| − | | 2 |

204

$S_0$ $S_1$
$(X_2, Y_2, X_3, Y_3, 1, 1, 0)$    $(X_3, Y_3, X_4, Y_4, 1, 1, 0)$
$(X_1, Y_1, X_8, Y_8, 2, 1, 1)$ $S_2$
$(X_4, Y_4, X_5, Y_5, 1, 1, 0)$    $(X_7, Y_7, X_6, Y_6, 2, 0, 1)$
$(X_8, Y_8, X_7, Y_7, 2, 0, 1)$    $(X_{10}, Y_{10}, X_{11}, Y_{11}, 1, 1, 0)$
$(X_{11}, Y_{11}, X_{12}, Y_{12}, 1, 1, 1)$    $(X_9, Y_9, X_{12}, Y_{12}, 2, 1, 0)$
$(X_5, Y_5, X_6, Y_6, 1, 1, 1)$ $S_3$
$(X_5, Y_5, X_6, Y_6, 1, 1, 1)$ $S_4$

METHOD AND APPARATUS FOR PROCESSING IMAGE DATA

BACKGROUND OF THE INVENTION

1. Field of the Invention

The present invention relates to a method and an apparatus for processing image data for sequentially filling inner regions of grahic and font characters and figures approximated by polygons with a black dot along scanning lines.

2. Description of the Prior Art

Image data processing of sequentially filling inner regions of characters and figures along scanning lines thereby to record or display the characters and figures is well known in the art in the name of "raster scanning". In such raster scanning, the characters and figures are approximated by polygons, inner regions of which are sequentially filled.

Such filling has been performed in the prior art in such a manner that image data of closed curves obtained from polygons are written in memory having storage areas in one-to-one correspondence to pixels of images to be recorded, and, after that, scanning for filling is performed in four vertical and horizontal four directions from a reference point which is set in an arbitrary position in each one of the closed curves.

In such a method, however, the time required for filling operation is increased in an apparatus such as a process scanner which records figures along scanning lines. furthermore, in the case of outputting an image having a relatively large numbers of pixels, a memory having a large storage capacity is required.

In order to overcome the problems, the following method is employed for recording an image formed by a number of pixels. When, for example, a pentagon as shown in FIG. 1 is transformed to raster image data, intersection points of segments formed by sequentially connecting respective vertices of the pentagon and the scanning lines are obtained by a CPU through linear interpolation, on the basis of coordinate values of the vertices $(X_1, Y_1)$, $(X_2, Y_2)$, ... $(X_5, Y_5)$. For example, Y coordinates $Y_n$ corresponding to X coordinates $X_n$ between the apexes $(X_1, Y_1)$ and $(X_2, Y_2)$ of the pentagon as shown in FIG. 1 are obtained as follows:

$$Y_n = Y_1 + \frac{X_n - X_1}{X_2 - X_1}(Y_2 - Y_1) \quad (1)$$

Then, as shown in FIG. 2, "raster start points" and "raster end points" are obtained as the intersection points of the scanning lines and the segments. In these points, "raster start points" are defined as the intersection points at which a scanning line enters from the outer region to the inner region of the figure. On the other hand, "raster end points" are defined as the intersection points at which a scanning line goes out from the inner region to the outer region of the figure. These data are registered per scanning line in a RAM, to be sequentially read from the RAM thereby to obtain raster image data as required.

More concretely, in a circuit as shown in FIG. 3, date "0" are written in all addresses of a RAM 12 in which one bit is assigned per pixel and having capacity for over one scanning line. After that, data "1" are written in addresses corresponding to the raster start and end points in a random access manner. Then an address selector 5 is switched from a random address mode to a sequential address mode to input read data $S_b$ read from the RAM 12 and clock signals $S_a$ synchronous with reading signals of the RAM 12 in an output data generator 13, which is shown in FIG. 4 in detail, thereby to obtain raster image signals $S_c$ as shown in FIG. 5.

In this method, however, another problem is caused in the case of outputting a figure formed by overlapping a plurality of unit figures, e.g., a nonagon indicated as ABCDEFGHI formed by overlapping two triangles ΔAEF and ΔHCJ, as shown in FIG. 14.

Namely, in this case, the coordinates of intersection points (B), (D), (G) and (I) must be also calculated for obtaining the contour of the nonagon. Thus, the time required for calculating intersection points of figures cannot be disregarded when the figures are complicated in configuration or a large number of unit figures are overlapped. This is because the processing time required for arithmetic is considerably increased in this method since, with respect to the relation of raster start and end points of the respective polygons, the raster start points may be changed to the raster end points or mere passage points etc.

Further, the raster start and end points may be doubled at the single vertex depending on intersection modes of the horizontal scanning lines and the polygons. In this case, the vertex must be treated as the raster start point while providing another end point adjacent to the start point. Therefore, the figure cannot be correctly reproduced at the start and end points.

SUMMARY OF THE INVENTION

The present invention is directed to a method and an apparatus for processing image data for obtaining raster output data for filling inner regions of one or more polygons along sequence of scanning lines thereby to record images.

The method of processing image data according to the present invention comprises a step of inputting coordinate data of terminal points of segments forming respective sides of polygons; a step of providing mode data for every segment with respect to whether points on the segment are in a raster start mode, a raster ending mode or a raster start and end mode with respect to the scanning on the basis of the coordinate data; a step of accumulating the mode data of each segment per record coordinate to write the accumlated mode data in a memory means; and a step of reading the mode data stored in the memory means along scanning lines to sequentially accumulate the mode data thereby to obtain the raster outputs for filling the inner regions of the polygons in response to the results of accumulation in respective positions on the scanning lines.

The apparatus for processing image data according to the present invention comprises means for executing the aforementioned respective steps.

According to an aspect (FIG. 6) of the present invention, the mode data has data length of three bits for one pixel. This data length may be generalized to n-bits (n: integer). The memory means is formed as RAMs having capacity for one or more scanning lines and cleared every time the stored mode data is entirely read to provide raster outputs. Accumulation and storage of the mode data per recording coordinate are performed by reading the mode data already written in classification memory means to transform the read mode data by newly provided mode data thereby to re-store in the memory means mode data thus obtained by the said transformation. The respective steps are sequentially repeated in compliance with the storage capacity of the memory means.

In addition to modes for respectively indicating whether points on corresponding segments are in raster start points or raster end points, the mode data can include specific points mode indicating raster start and end points. Thus, processing of terminal points of segments is improved in efficiency.

According to another aspect (FIG. 23) of the present invention, the step of providing mode data for respective segments and the step of accumulating the mode with respect to each segment per recording coordinate to write the same in the memory means are performed through providing the following first to fourth intermediate signals in sequence. The feature of this resides in that the respective segments are independently processed with no regard to which polygon the segments are obtained from.

Within the said signals, the first intermediate signals are obtained with respect to all of the segments forming the respective sides of the polygons on the basis of coordinate data of sequentially continuing four vertices including both terminal points of the segment as intermediate two vertices thereof in the said polygons, and include:

(1) coordinates ($X_s$, $Y_s$) and $X_e$, $Y_e$) of both terminal points of segments connecting the intermediate two vertices, (2) the mode data $L_m$, and (3) first flags $E_s$ and $E_e$ with respect to record start and end points of the segments.

The second intermediate signals are obtained by converting the first intermediate signals, and include:

(1) the record start point coordinates ($X_s$, $Y_s$) of every segment, (2) the number $\Delta X$ of vertical scanning lines of segment, (3) the coefficient $dY/dX$ of inclination, (4) the mode data $L_m$, and (5) the first flags $E_s$ and $E_e$.

The first or second intermediate signals are permuted along the sequence of the scanning lines. This permutation can be performed by classifying and storing the second intermediate signals to classification memories assigned per storage area in the vertical scanning direction, and by reading the second intermediate signals in the sequence of scanning.

The third intermediate signals are obtained from the second intermediate signals, and include:

(1) positional coordinates X and Y with respect to the respective intersection points of the segments and the scanning lines, (2) the mode data $L_m$, and (3) second flags F.

The fourth intermediate signals are obtained by converting the third intermediate signals in accordance with the second flags F, and include:

(1) positional coordinates X and Y with respect to the intersection points of the segments and the scanning lines, and (2) the mode data $L_m$.

The mode data $L_m$ included in the fourth intermediate signals is accumulated per recording coordinate to be stored in the said memory means. Recording positions are designated by the positional coordinates X and Y while outputs in raster scanning are obtained by reading and accumulation of the mode data $L_m$.

Accordingly, an object of the present invention is to provide a method and an apparatus for processing image data which can obtain raster output data for recording images by filling inner regions of polygons along a sequence of scanning lines at a high speed.

Another object of the present invention is to efficiently perform image processing of a plurality of overlapped polygons.

Still another object of the present invention is to correctly process vertices of polygons.

A further object of the present invention is to simplify circuit structure while reducing capacity of memory as employed.

These and other objects, features, aspects and advantages of the present invention will become more apparent from the following detailed description of the present invention when taken in conjunction with the accompanying drawings.

BRIEF DESCRIPTION OF THE DRAWINGS

FIGS. 10 to 12 are diagrams for illustrating directivity of segments;

FIG. 27(A) and FIG. 27(B) are diagrams showing examples of ROM tables in the segment decomposition circuit;

DESCRIPTION OF THE PREFERRED EMBODIMENTS

First Embodiment (A) Mode Data Providing Process

Figure 1:
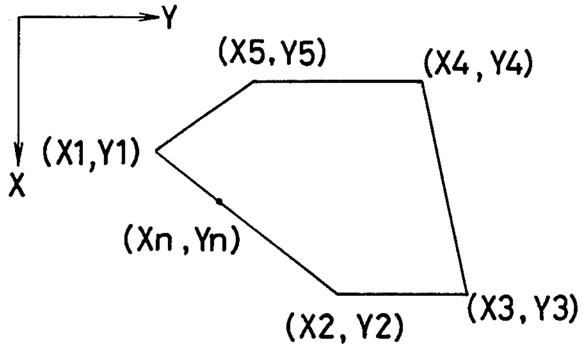
FIGS. 1 and 2 are conceptual diagrams of raster scanning.
Figure 2:
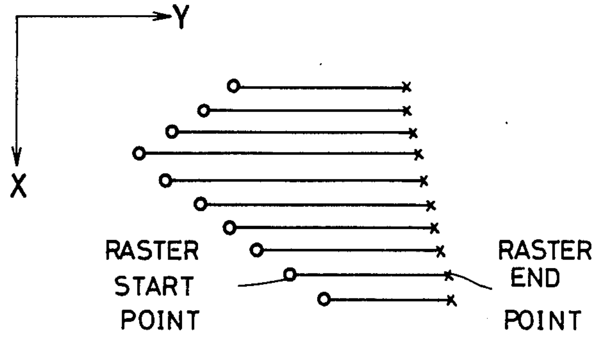
Figure 4:
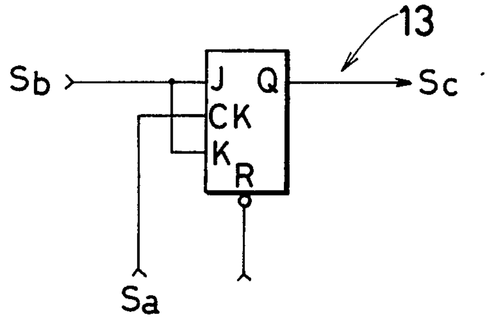
FIGS. 3 to 5 are diagrams showing structure and operation of a conventional apparatus.
Figure 3:
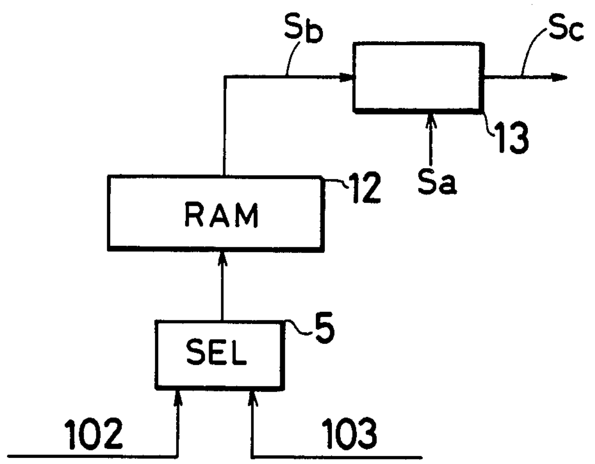
Figure 5:
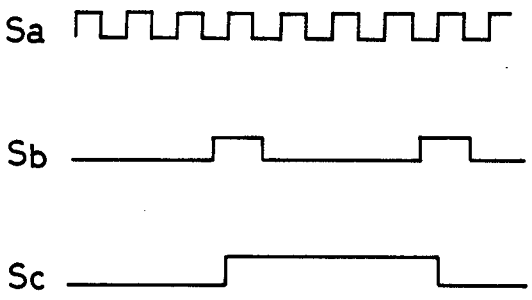
Figure 6:
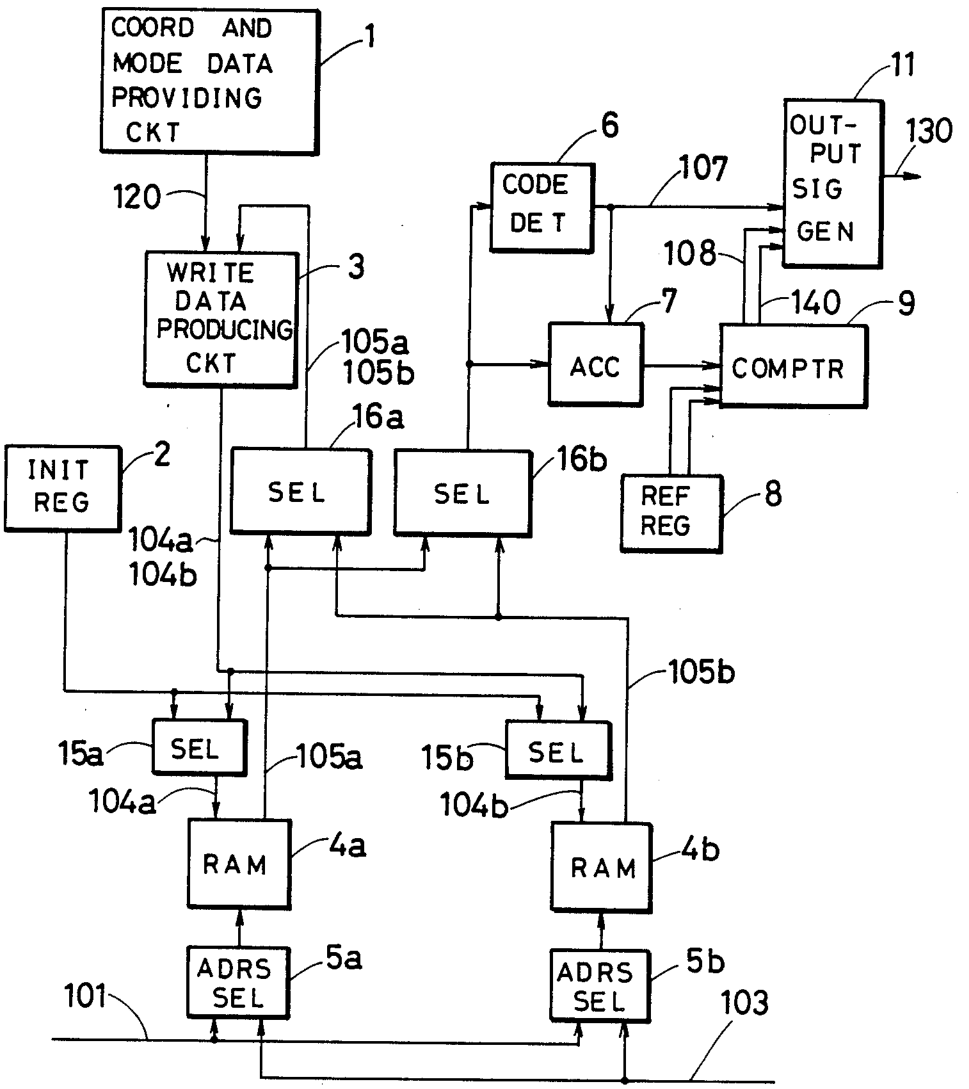
FIG. 6 is a block diagram schematically showing the structure of a first embodiment of the present invention.

FIG. 6 is a block diagram showing a first embodiment of the present invention. Referring to FIG. 6, a coordinate and mode data providing circuit 1 provides coordinate data and "mode data" to the segments forming respective sides of one or more polygons. The "mode data" is provided for indicating whether intersection points of the segments and scanning lines are raster start points, raster end points or raster start and end points, when an image is recorded by filling inner regions of the polygons along the scanning lines. According to this embodiment, this process of the coordinate and mode data providing circuit 1 is performed in a software manner, the principle of which is now described.

Figure 7:
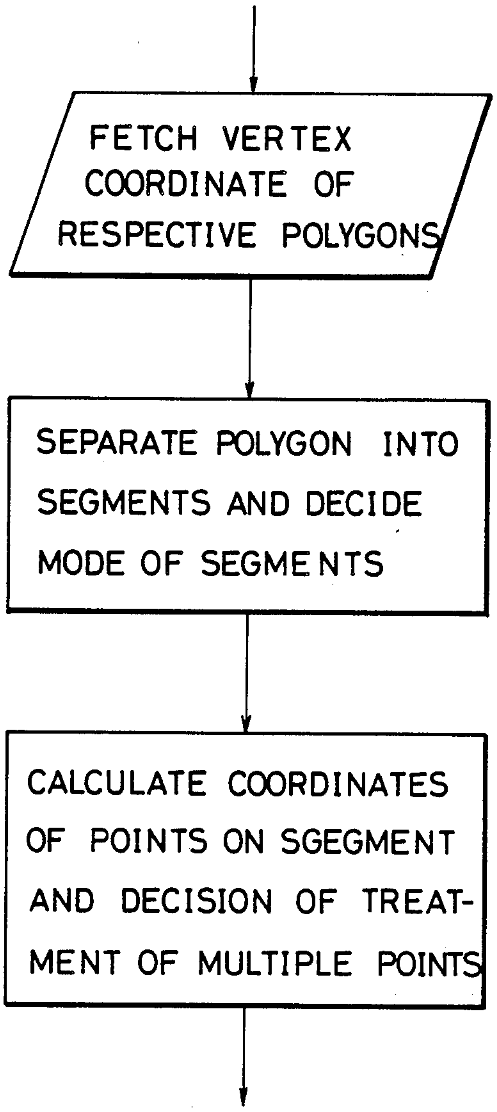
FIG. 7 is a flow chart showing operation of a coordinate and mode data providing circuit.
Figure 8A:
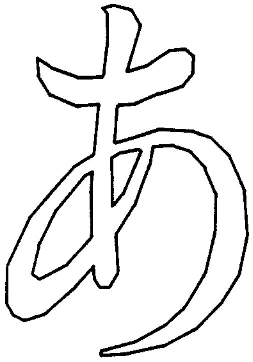
FIGS. 8A to 8G are diagrams showing examples of overlapped polygons and processing for filling the polygons.
Figure 8B:
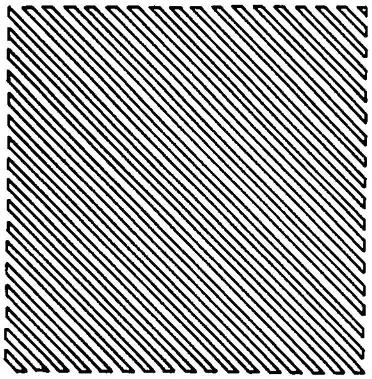
Figure 8C:
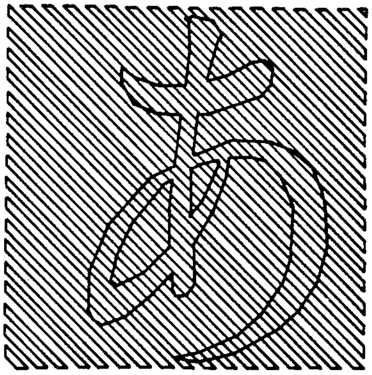
Figure 8D:
Figure 8E:
Figure 8F:
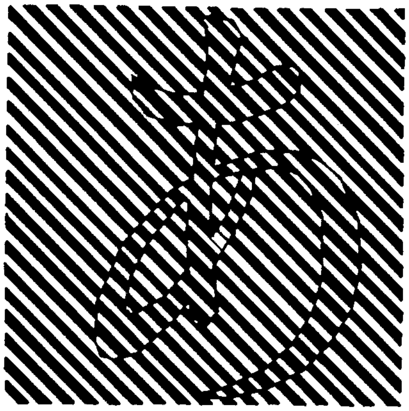

FIG. 7 is a flow chart of the processing, and FIGS. 8A and 8B are examples of polygons to be recorded. According to the present invention, the polygons shown in FIGS. 8A and 8B are overlapped as shown in FIG. 8C, then the inner regions thereof are filled as shown in FIGS. 8D to 8F. Curves such as circles are also digitally processed as polygons, an example of which is character font. In fact, the figure as shown in FIG. 8A is a Japanese character approximated by a polygon.

Reffering to FIG. 7, first, fetched are vertex coordinates of respective polygons. As to the coordinates, those previously stored for every polygonal pattern may be utilized. Such a method is employed in the case where, e.g., character fonts are previously stored.

Figure 9B:
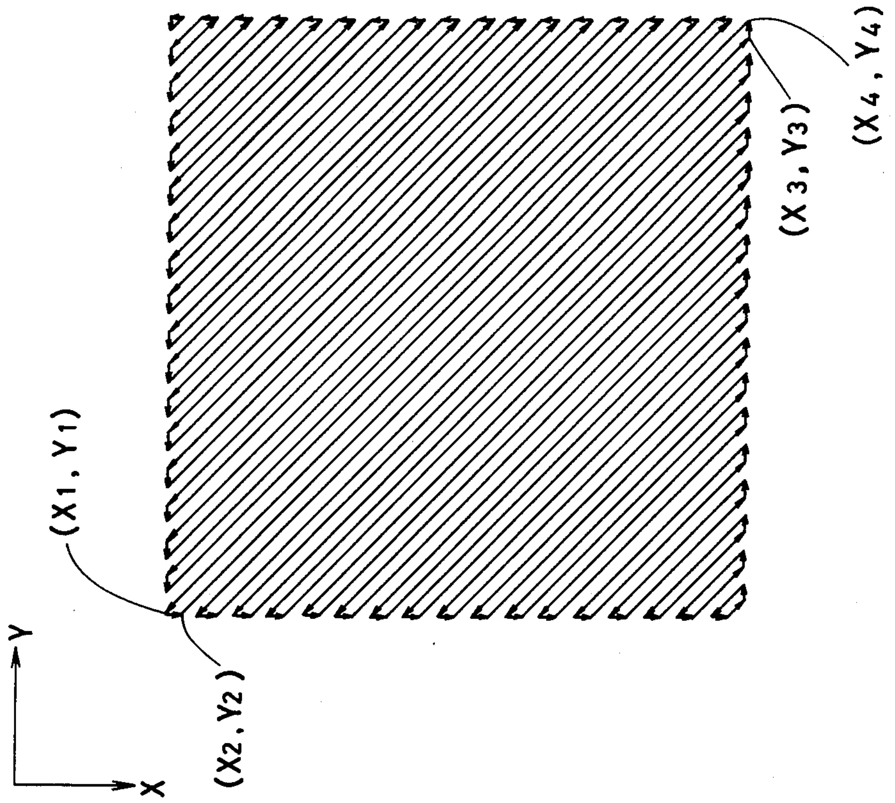
FIGS. 9A and 9B are diagrams for illustrating segments forming polygons.
Figure 9A:
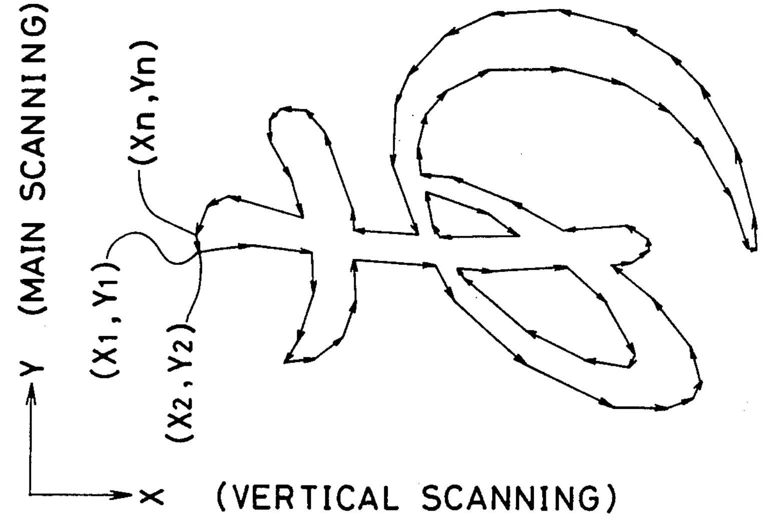

Then coordinate of terminal points of segments in the respective figures, which are identical to the vertices of the figures, are sequentially inputted to decide inclinations of the segments, thereby to determine whether the segments are formed as sets of raster start points or sets of raster ending points. For example, when polygons shown in FIGS. 8A and 8B are previously provided as anticlockwisely designated vector data as shown in FIGS. 9A and 9B respectively, inner regions of the figures are on the left sides of the respective vectors in the directions of arrows. Assuming that the coordinates of the end points of the segments are expressed as $(X_1, Y_1)$, $(X_2, Y_2)$, . . . , $(X_n, Y_n)$, symbols X and Y being representative of vertical and main scanning coordinates and each scannings being performed to the directions as shown by arrows X and Y, inclinations of the segments are given as $\Delta Y/\Delta X$, where $\Delta Y=Y_{i+1}-Y_i$ and $\Delta X=X_{i+1}-X_i$.

As simply shown in FIG. 10, the main scanning lines intersect with the segments from the exterior of the polygon into the interior of the inner region when the X component of segment vector has a sign (+) irrelevant to whether the sign of the Y component is (+), (0) or (−). Also indicated is that the main scanning lines intersect with the segment from of the inner region of the polygon to the exterior of the polygon when a sign (−) is assigned to X component irrelevant to whether the sign of the Y component is (+), (0) or (−). Further indicated is that the segment is parallel line in the main scanning direction when X is (0) and the Y component is with (+), while the segment is parallel lines in the reverse direction when the X component is (0) and the Y component is with (−).

FIG. 11 shows the said relation, in which the aforementioned modes of the segments are indicated as overline (OL), underline (UL), downline (DOWN) and upline (UP) respectively. Thus, the modes of the segments can be decided by sequentially inputting the coordinate of the terminal points of the segments to obtain inclinations thereof.

Even if only two coordinate points are inputted, the mode of the segment can be decided depending on whether $\Delta X \neq 0$ or $\Delta X=0$ as shown in FIGS. 12(A) and (B). When coordinate of only one point is inputtted, the point is treated as the "segment" of overline (OL) and the underline (UL) as shown in FIG. 12*c*).

After the segment modes are decided in the aforementioned manner, the main scanning coordinates (Y) are calculated in all of the vertical scanning positions (X) of the respective segments. When the segments are (OL), the respective points on the segments are recognized as raster start points designated as "mode 1", which are expressed as "M1" in data indication. When the segments are (UL), the respective points on the segments are recognized as raster ending points designated as "modes 2", which are expressed as "M2" in data indication.

When the segment is (UP), the smaller one of the Y coordinate values of the two terminal points is treated as a "mode 1" point while the larger one is treated as a "mode 2" point. When the segment is (DOWN), the smaller of the Y coordinate values of the terminal points is treated as a "mode 1" point while the larger one is treated as a "mode 2" point.

Figure 13:
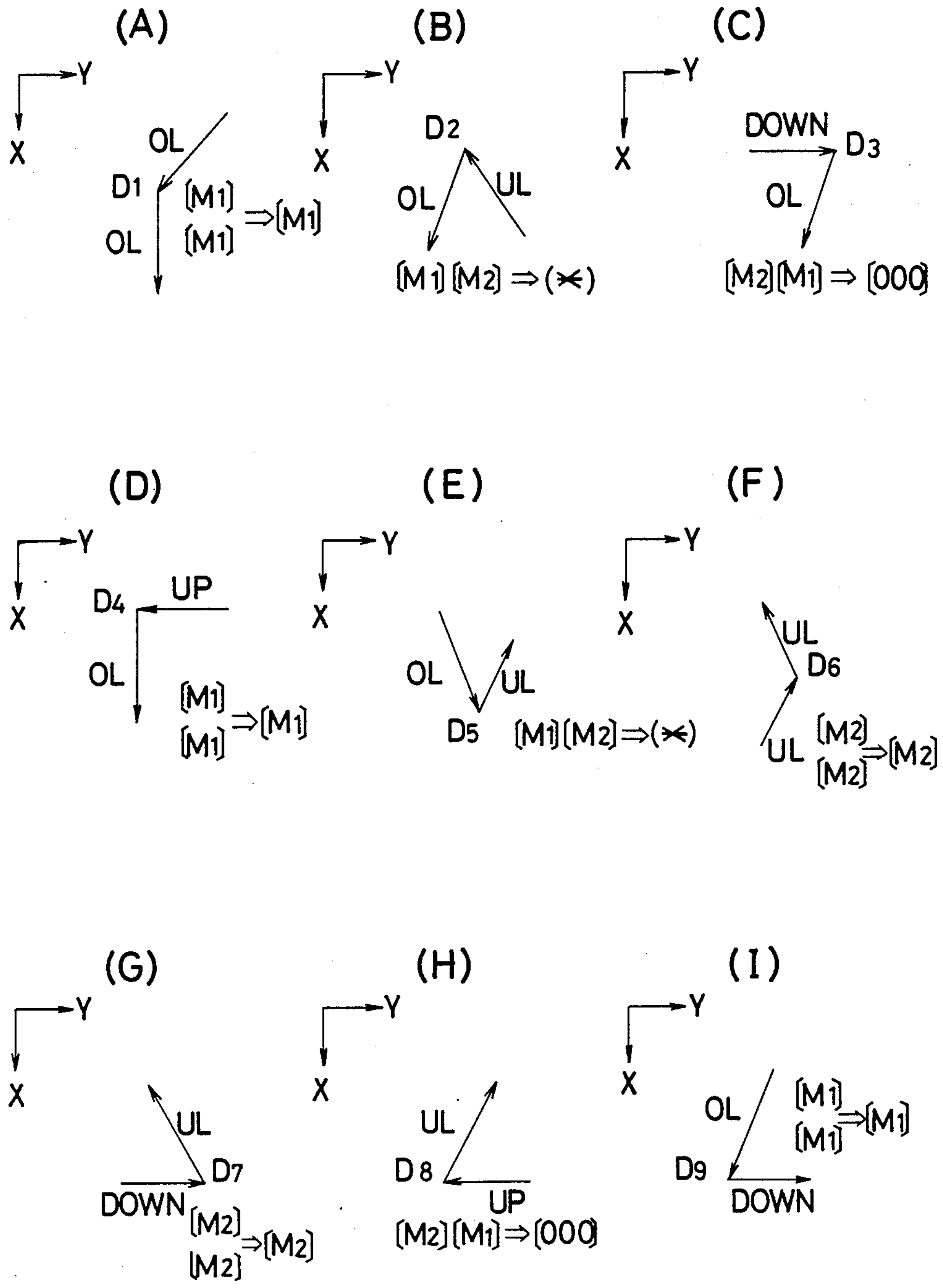
FIG. 13(A) to 13(P) is a diagram showing a relation between connection modes of segments and modes of terminal points.
Figure 13:
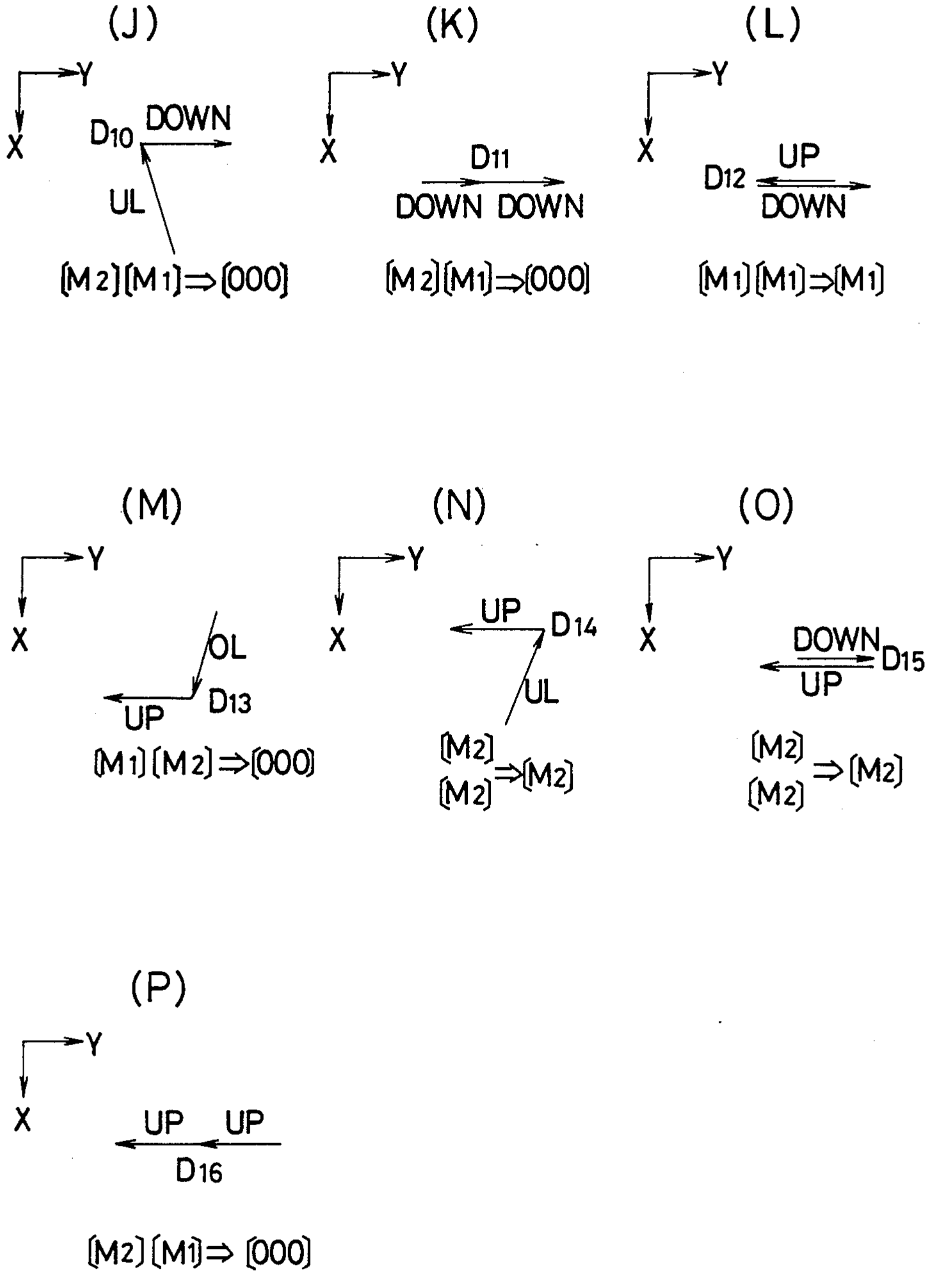

As to the modes of connection points of the segments in the same figure, 16 combinations may be considered as shown by symbols $D_1$ to $D_{16}$ at FIGS. 13(A) to (P). Within these connection points, points $D_1$, $D_4$, $D_9$ and $D_{12}$ denote multiple points of the "mode 1" and points $D_6$, $D_7$, $D_{14}$ and $D_{15}$ denote multiple points of the "mode 2".

The aforementioned connection points are designated as single "mode 1" points or single "mode 2" points so that the connection points are not doubly designated as the "mode 1" or "mode 2" points from both of two segments to hinder the processing as hereinafter described. In other words, mode designation of these connection points is simply performed from one of the connected segments, while designation is not performed from the other segment. In this case, information as to whether or not the terminal points of the segments are coupled with those of other segments of the same mode is given at the same time when the modes of the segments forming the respective figures are designated.

The aforementioned processing is not necessary for the points $D_2$ and $D_5$, which are the connection points of (OL) and (UL), while these points are designated as specific mode (*) which means "modes 1 and 2" as hereinafter described. The other connection points $D_3$, $D_8$, $D_{10}$, $D_{11}$, $D_{13}$ and $D_{16}$ of the segments which are neither the multiple points nor the specific points are relay points, which are not to be designated as the "mode 1" nor "mode 2" points in the respective segments. Such information is given at the same time when the segment modes in the respective figures are designated, similarly to the case of the multiple points.

(B) Mode Data Storage Process

When the said process for providing mode data is completed, the coordinate data and the mode data for the segments forming the respective polygons are written in a RAM 4*a* shown in FIG. 6, as hereinafter described. The write operation is performed in accordance with the order of the vertical scanning lines. In order to avoid complexity in illustration of the processing the figures as shown in FIGS. 8A to 8C, 9A and 9B, description is now made with respect to a simpler figure.

Figure 14:
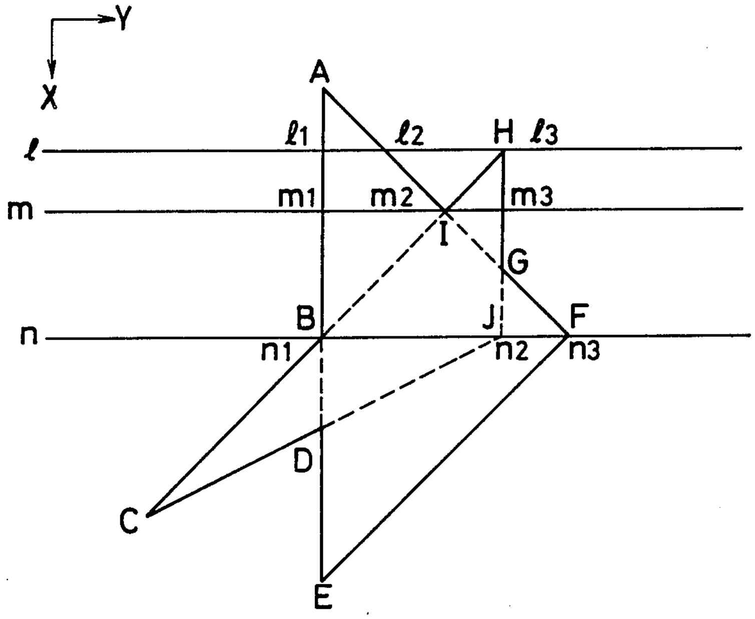
FIGS. 14 and 15 illustrate examples of overlapped polygons.

FIG. 14 shows an example of such simpler figure, which is a nonagon ABCDEFGHI formed by overlapping two triangles ΔAEF and ΔHCJ. It is assumed that ΔAEF corresponds to the figure as shown in FIGS. 8A and 9A while ΔHCJ corresponds to that shown in FIGS. 8B and 9B.

Figure 15:
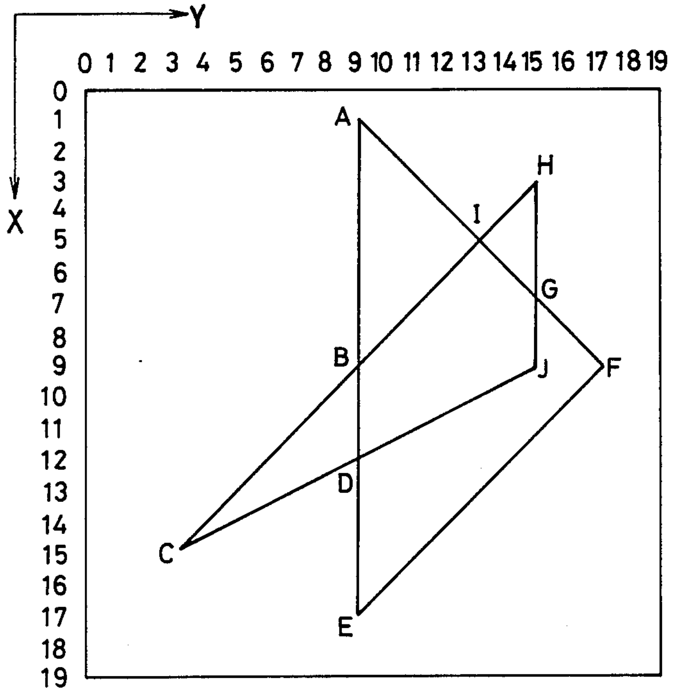

First, the aforementioned process of providing a mode data is performed on ΔAEF and ΔHCJ. Respective points on a segment $\overline{AE}$ of ΔAEF are raster starting points and respective points on segments $\overline{AF}$ and $\overline{FE}$ are raster ending points. In concrete terms, coordinate values and mode data for the respective points in the coordinate system as shown in FIG. 15 are as follows:

| | |
|---|---|
| Respective points on segment $\overline{AE}$: | [1,9,M1],[2,9M1],. . .,[7,9,M1] |
| Respective points on segment $\overline{AF}$: | [1,9,M2],[2,10,M2],. . .,[9,17,M2] |
| Respective points on segment FE: | [10,16,M2],. . .,[17,9,M2 |

In these points, a point (9, 17) on the segment $\overline{FE}$ is a multiple point of the "mode 2", which is already designated as "mode 2" by the segment $\overline{AF}$. Therefore, the designation by the segment FE is not required. Further, a point (1, 9) finally becomes (1, 9, *), and a point (17, 9) finally becomes (17, 9, *). ΔHCJ are also provided with coordinate values and mode data.

In order to write the respective data in the RAM 4*a* having a storage region in which 3 bits are assigned to every one pixel, the RAM 4*a* is cleared in advance. This process is performed by writing "000" in all of the pixels of the RAM 4*a* from an initial value register 2 through a write data selector 15*a*.

Then the coordinate values and the mode data of the segments forming the respective polygons are sequentially written in the RAM 4*a*.

In order to sequentially write the polygons in the RAM 4*a* in the aforementioned manner, it is necessary to write the data overlappingly in the same addresses of the RAM 4*a* when a plurality of polygons are overlapped. In other words, a plurality of writing processes are required as to intersection points of the polygons. In this case, it is not sufficient to store the data merely designating to which modes the intersection points belong, but it is necessary to store the substantial numbers of the segments overlappingly forming the intersection points a well as the modes thereof in order to perform a recording with respect to the overlapping condition.

Therefore, according to this embodiment, the raster start and end points are respectively indicated by the signs (+) and (−) while the raster starting points are registered in the "mode 1" and the end points are registered in the "mode 2". When the raster start and end points in the same addresses are different in number, the sign of the mode of larger one and the numbers of the difference are indicated by numerical data. In concrete terms, the "mode 1" is expressed as (+1) and the "mode 2" is expressed as (−1) to sequentially add up or accumulate the (+1) or (−1) provided with respect to the modes of the respective segments forming the said intersection points. The results of the accumulation are expressed by three bits code. Within these three bits, the most significant bit is employed to distinguish the start and end points by the rule of "0"=(+) and "1"=(−). The less significant two bits are adapted to express absolute values of the accumulated mode data generated by overlapping of the modes in the 2's complement form. Namely, the less significant two bits directly represent the overlapping number in "mode", while the overlapping number is represented by 2's complement number of the two bits in "mode 2". When, as the results of the accumlation, the number of segments of the "mode 1" forming the intersection point is identical to that of the "mode 2", it is expressed as specific points (*) which are raster start and end points. The specific code (*) indicating the specific point is expressed by "100".

Figures 16A, 16B:
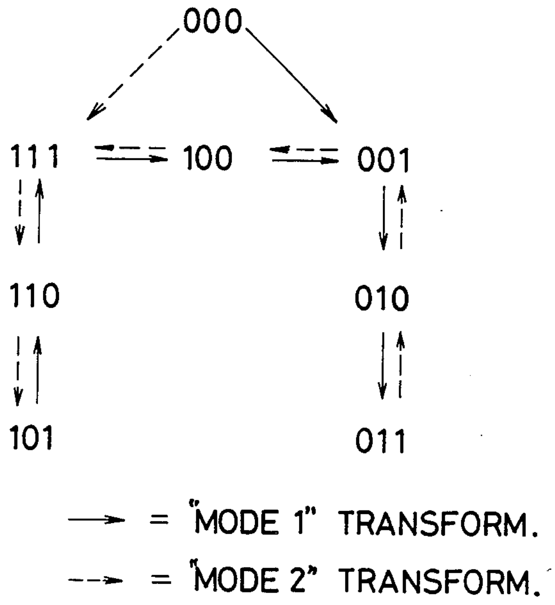
FIGS. 16A and 16B are diagrams showing code transformation rules in respective modes.

FIG. 16A expresses a transformation rule when the aforementioned 3 bits codes are sequentially provided for one intersection point and they are accumulated in sequence. For example, code data "001" already written in address corresponding to the coordinate of a point is transformed to "010" when a segment of the "mode 1" is subsequently overlapped thereon, to indicate that the point is an intersection point at which "10"=two segments of the "mode 1" are overlapped. FIG. 16B systematically shows the rules of FIG. 16A, for clearer understanding of the rule. It is to be noted that "000" in FIG. 16B indicates an initial value.

Such expression of the accumulated modes is characterized in that respective 3 bits data groups of the "mode 1" and "mode 2" are expressed by complementary numbers of "2". For example, an accumulated code data "010" of an intersection point in which the "mode 1" segments are overlapped in a number larger by two than the "mode 2" segments as a result is in complementary relation to an intersection point expressed by "110" which is reverse to the said case. In other words, such relation is expressed as "010 +"110"="000". Therefore, the addition of complementary 2 code data is substantially equivalent to the subtraction of the repective absolute values of overlapping number.

When expression is made in three bits as hereinabove described, numerical data within a range of (+3) to (−3) can be expressed as follows:

| | |
|---|---|
| (+3) = "011", | (+2) = "010" |
| (+1) = "001", | (0) = "000" |
| (−1) = "111", | (−2) = "110" |
| (−3) = "101" | |

Further, the specific code (*) is assigned to (−4)="100". Namely, an accumulated mode data of overlapping point formed by overlapping of three point at maximum can be expressed in three bits. Hence, when the number of the overlapped figures (polygons) is up to three, it is necessary and sufficient to prepare three bits for accumulation data. When more figures are overlapped, a range of the overlapping number from $-(2^{n-1}-1)$ to $(2^{n-1}-1)$ can be expressed by generalizing the data length to n-bits (n: integer) while numerical data $(-2^{n-1})$ are assigned to the specific code so far as the number of the specific code is one. Namely, up to $(2^{n-1}-1)$ overlapped figures can be treated when the data length in RAM 4a is n-bits. In the aforementioned method, efficiency of describing overlapping is improved with increase in number of the overlapped figures in comparison with the case of utilizing a plurality of memories corresponding to the figures in which mode data is expressed one-bit indicating raster start or end points.

Under the condition that mode transformation rules in the same addresses are predetermined for the respective ones of the "mode 1" and "mode 2" as shown in FIGS. 16A and 16B, a random access signal 101 in FIG. 6 is activated to input the data on the intersection points of the respective scanning lines and the respective figure in the RAM 4a through the address selector 5a. Such input is performed in a scanning sequence with respect to the vertical scanning direction and at random with respect to the main scanning direction.

With respect to, e.g., the figure as shown in FIG. 14, data on the intersection points of the scanning lines and ΔAEF are sequentially supplied from the coordinate and mode data providing circuit 1 as shown in FIG. 6 to the write data producing circuit 3 by writing control signals 120. In parallel with this, the initial values "000" registered in the RAM 4a are read as signals 105a, to be supplied to the write data producing circuit 3 through a read data selector 16a.

Figure 17:
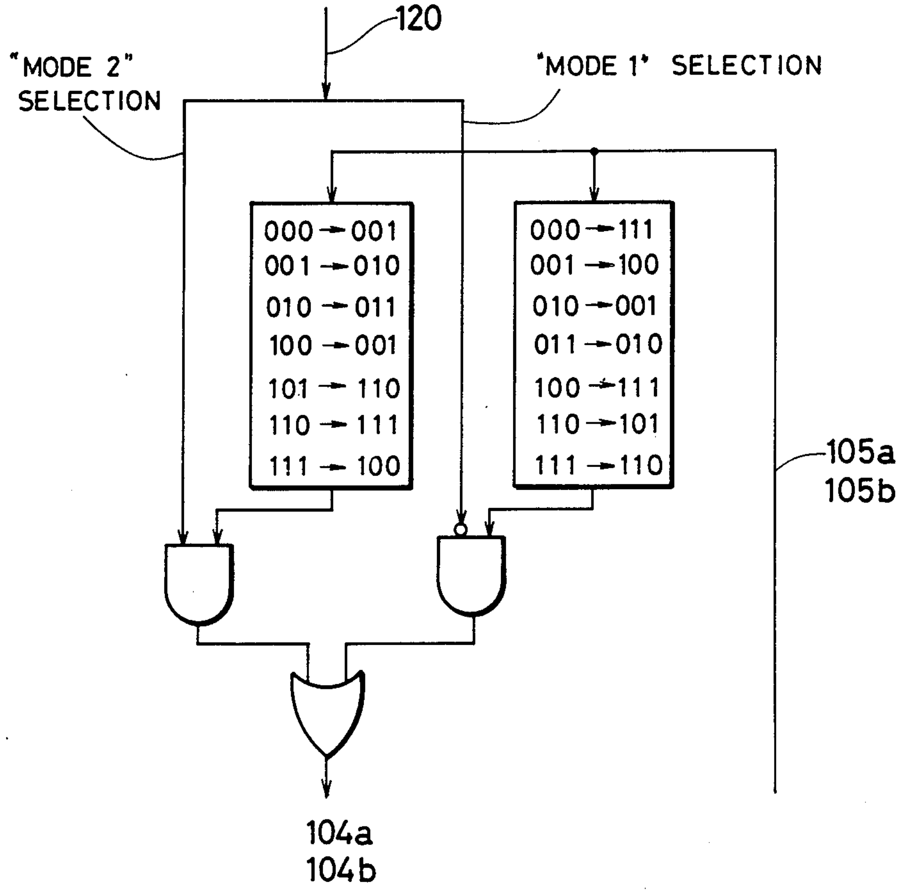
FIG. 17 is a diagram showing an example of structure of a write data producing circuit.

The write data producing circuit 3 has a circuit structure as shown in FIG. 17. Referring to FIG. 17, code signals 105a from the read data selector 16a are code-transformed by the transformation rules for the "mode 1" and "mode 2" as shown in FIG. 16A, thereby to be accumulated per record coordinate. In response to the mode data of the point included in the writing control signals 120, one of the results of the code trsnsformation corresponding to the two modes is selected to be outputted as write data 104.

For example, the following explanation is provided for the respective points on the segments forming ΔAEF in FIG. 14. Within these points, a point $l_1$ intersecting with a scanning line l is a raster start point of "the mode 1", and hence the initial value "000" of the read data 105 is transformed to "001", which becomes write data 104a as shown in FIG. 6. Further, since a point $l_2$ is the raster end point of the "mode 2", the initial value "000" for this point $l_2$ is transformed to "111". The write data 104a obtained by such transformation are restored in to the RAM 4a through a write data selector 15a. Writing addresses for this are identical to those in which the respective data expressed by the code signal 105a were previously stored.

Thereafter in a similar manner, the mode data of respective raster start and end points on ΔAEF are accumulated and restored in the RAM 4a. Data about the vertex "A" in FIG. 14, which is a specific point, is transformed from "000" to "100" through "001" as seen from FIG. 16B, by being subjected to registration on the segment $\overline{AE}$ (mode 1) and registration on the segment $\overline{AF}$ (mode 2). The code data of vertex "E" also becomes a specific point, i.e., "100". On the other hand, code data with respect to the vertex "F" becomes "111" by the aforementioned rule for avoiding double designation.

Thereafter ΔHCJ is registered in a similar manner. Although, in this case, "111" is already registered with respect to an intersection point $m_2$ of a segment $\overline{HC}$ and a scanning line m since this is an end point as a point on the segment $\overline{AF}$, the data "111" is further transformed to "100" since the point $m_2$ is a start point for registration with respect to the segment $\overline{HC}$. It is thus indicated that the intersection point $m_2$ becomes a vertex in the figure ABCDEFGHI composed of ΔAEF and ΔHCJ. Further, "001" is already registered for a point $n_1$ on a scanning line n, since the point $n_1$ is a starting point as a point on the segment $\overline{AE}$. This point $n_1$ is also a starting point as a point on the segment $\overline{HC}$, and hence the data "001" is further transformed to "010" by code transformation of the "mode 1" in the same address, and the new code is re-registered in the RAM 4a. Such presence of the point $n_1$, for which "010" = (+2) is registered as code data, indicates that two raster end points are present on the scanning line n in the rear of the point $n_1$ (right-hand direction in FIG. 14). In fact, points $n_2$ and $n_3$ in FIG. 14 are these raster end points.

Figure 18:
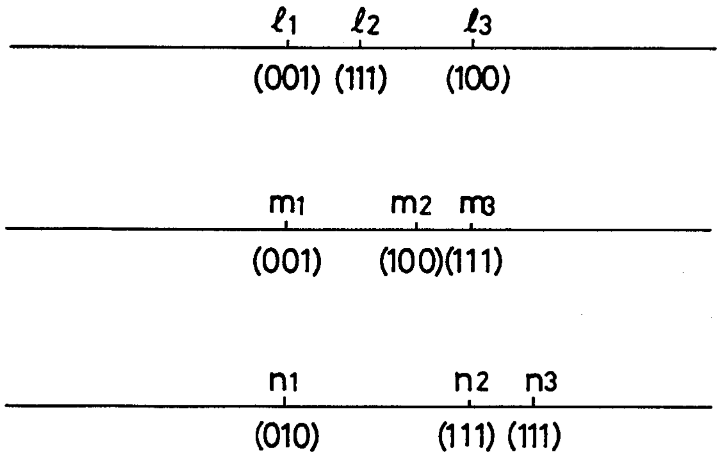
FIGS. 18 and 19 are diagrams showing code data finally obtained with respect to the polygons as shown in FIG. 14.
Figure 19:
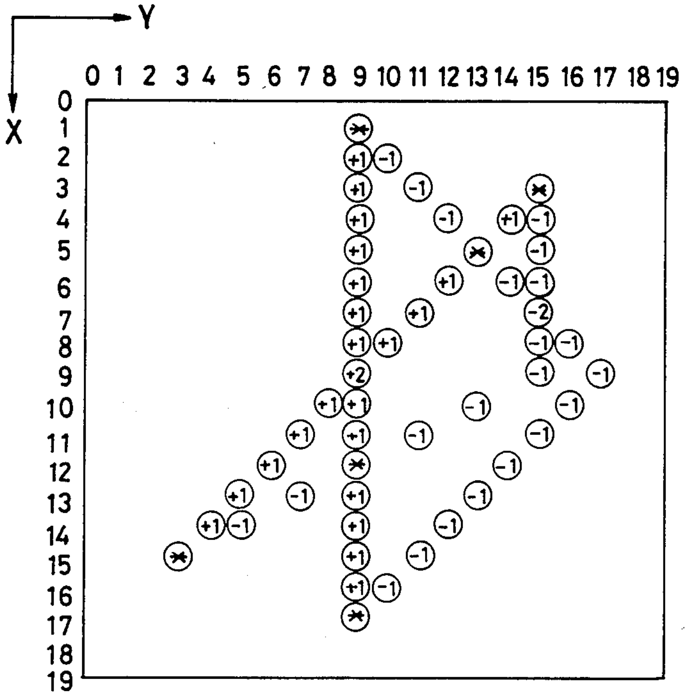

When the registration process is progressed in the aforementioned manner to completely accumulate and register ΔAEF and ΔHCJ, the respective points $l_1$ to $l_3$, $m_1$ to $m_3$ and $n_1$ to $n_3$ on the respective scanning lines l, m and n are registered in the codes as shown in FIG. 18. Further, FIG. 19 shows the codes actually registered with respect to the respective points in the coordinate system as shown in FIG. 15, in which the numbers with sign (+) or (−) are assigned to numerical values expressing the numbers of overlapping of the figures. Symbol (*) denotes specific points as hereinabove described.

Also in the case of generalizing the code data to n-bits, the write data can be produced at random regardless of the sequence used for registering the figures.

(C) Reading from RAM and Recording Process

When the data are thus completely registered to the whole storage capacity of the RAM 4a, the address selector 5a as shown in FIG. 6 selects sequential address signals 103, by which the data are read out from the RAM 4a. Then, raster image data are produced on the basis of the read data.

A comparator 9 used for such processing contains a plurality of unit comparators (not shown) therein, and the amount of the unit comparators corresponds to the number of overlapping of the figured to be inputted. Similarly, a reference register 8 contains a plurality of unit reference registers (not shown) therein thereby to provide reference values to the respective ones of the plurality of the unit comparators.

Figure 22A:
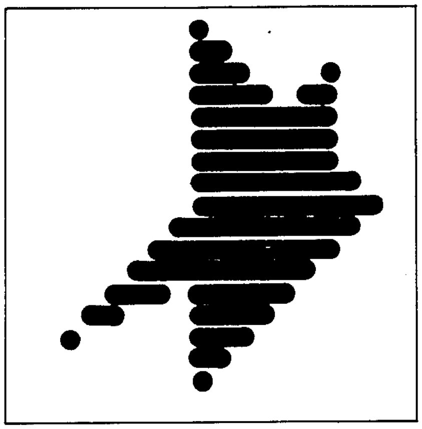
FIGS. 22A to 22C are diagrams showing examples of the recorded image with filling of the polygons as shown in FIG. 14.

Two output signals 108 and 140 from the comparator 9 are in the following properties:

Output Signal 108:

This signal becomes "1" when an output value from an accumulator 7 for accumulating code data supplied from the RAM 4a or a RAM 4b through the read selector 16b is equal to or more than a first reference value "001" supplied from the reference register 8, while it becomes "0" in other case. As hereinafter described, the RAM 4b is used for storing the code data altenatively with the RAM 4a, Output Signal 140:

This signal becomes "1" when the output value from the accumulator 7 is equal to or more than a second reference value "000" supplied from the reference register 8, while it becomes "0" otherwise. Therefore, this signal 140 is always "1" in this embodiment (FIG. 22A).

Figure 20:
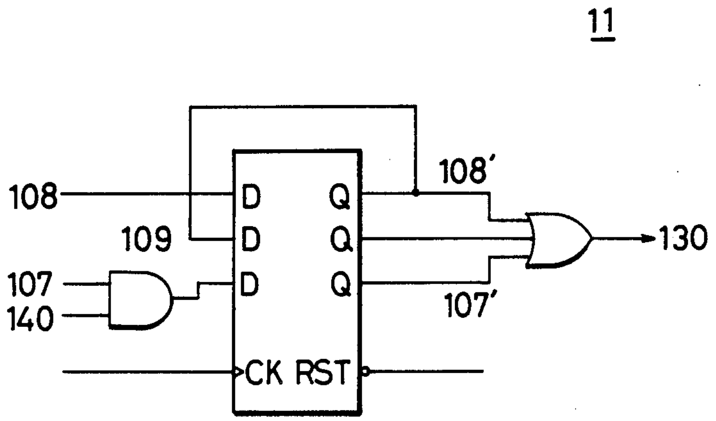
FIG. 20 is a block diagram showing an example of structure of an output signal generator.

FIG. 20 shows an output signal generator 11 in detail, which provides an output signal 130 in response to the values of input signals 107, 108 and 140. The reason why the logical product of the signals 107 and 140 is produced in the output signal generator 11 is hereinafter described.

Figure 21:
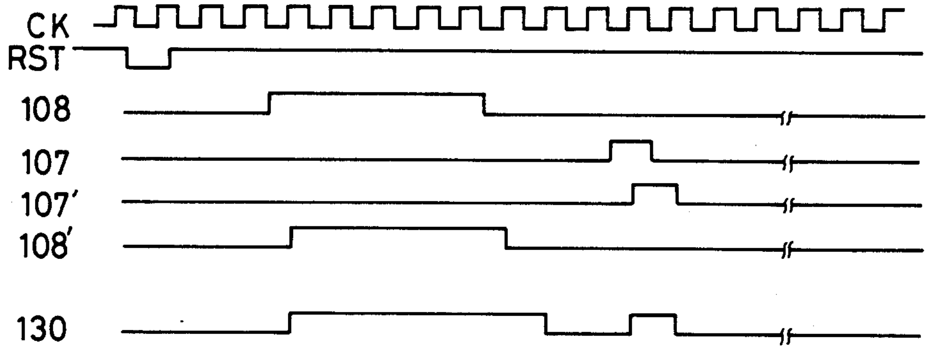
FIG. 21 is a timing chart showing output operation of the first embodiment.

Description is now provided for a recording operation along the scanning line l as shown in FIG. 14, also with reference to a timing chart as shown in FIG. 21. A code detector 6 and the accumulator 7 are reset before starting of the respective main scanning operation.

First, the data in the RAM 4*a* are sequentially read out as a signal 105*a* through the read selector 16*b* to be accumulated by the accumulator 7. With respect to the scanning line l, the code data in the RAM 4*a* with respect to pixels in the intervals before scanning reaches the point $l_1$ remain as the initial value "000", and hence the result of accumulation remains at "000" to the point $l_1$. Therefore, both of the output signal 107 from the code detector 6 for detecting the code "100" of the specific point and one output signal 108 from the comparator 9 are "0", while the other output signal 140 from the comparator 9 is "1".

Therefore, the output signal 130 from the output signal generator 11 as shown in FIG. 20 is "0" since the input signals 107, 108 and 140 have the aforementioned values respectively.

When the scanning reaches the point $l_1$, the code data 105*a* from the RAM 4*a* becomes "001" and hence the result of accumulation by the accumulator 7 becomes "001", whereby the comparator 9 compares the reference value "001" from the reference register 8 with the said value, to change the signal 108 to "1". Therefore, the output signal 130 also becomes "1".

In the interval from the point $l_1$ to the point $l_2$, the code data from the RAM 4*a* is always "000", and hence the output signal 130 remains at "1".

When the code data "111" with respect to the point $l_2$ is read out, the result of accumulation in the accumulator 7 becomes "000", whereby the signal 108 becomes "0". This means that the accumulator 7 in this time performs substantial subtraction of the numbers of the raster start and end points along the scanning line l, by utilization of the 2's complement expression as the code data.

Consequently, a signal 108' in FIG. 20 also becomes "0", whereas the signal 108' is in a delay by one clock period from the signal 108. However, the signal 108' is re-used as a signal 109, and hence the signal 130 does not become "0" at the point $l_2$ and is changed to "0" at a pixel adjacent to the point $l_2$ (see FIG. 21). Namely, the signal 108' is re-used as the signal 109 to prevent default of the output by one dot when the output 130 is changed from "1" to "0".

When the scanning reaches the point $l_3$, the code data is changed to the specific code "100". Then, the code detector 6 detects the specific code "100" and the output signal 107 from the code detector 6 becomes "1", whereby the accumulator 7 is controlled to maintain an accumulated value at a point immediately ahead thereof, while the output signal 130 becomes "1" by one dot. The reason why accumulator 7 is so controlled as to maintain the accumulated value at the point immediately ahead thereof is that it is required to prevent further addition of "100" ($=-4$) to the accumulated value at the specific point in which the difference between the respective numbers of the overlapped start and end points are zero.

In the interval between the point $l_3$ and the end terminal point of the scanning line l, the code data from the RAM 4*a* is "000" and hence the output signal 130 remains at "0". When the scanning reaches the end terminal point, the scanning of the scanning line l is completed.

In a time interval for reading the data from one RAM 4*a* to perform recording, data exceeding the storage capacity of the RAM 4*a* are written in the other RAM 4 with respect to main scanning lines in a subsequent image part. Such writing is performed along the sequence of vertical scanning with respect to the vertical scanning direction and at random with respect to the main scanning direction similarly to the writing in the RAM 4*a*. When the data reading from the RAM 4*a* is completed, the subsequent data are read from the RAM 4*b*, whereby the output signal generator 11 outputs the recording signals 130 in sequence along the scanning lines. The reading and recording with respect to RAM 4*b* are performed along the sequence of scanning in both of the vertical and main scanning directions, similarly to the case of the RAM 4*a*.

Thus, are the writing operation and the reading operation are alternately performed in the RAMs 4*a* and 4*b*. Needless to say, the RAMs can be further increased in number.

FIG. 22A shows record data thus produced with respect to the figure ABCDEFGHI.

Although the inner region of the overlapped figures are evenly filled in the aforementioned example, such filling can be performed with restricting regions in response to the number and types of the overlapped figures, and description is now made on such case.

For example, the first and second reference values set in the reference register 8 are changed to "010" and "001" respectively in the aforementioned embodiment. Then, the output signal 108 from the comparator 9 becomes "1" when the output value from the accumulator 7 is equal to or more than the first reference value "010" while the output signal 140 becomes "1" when the output value from the accumulator 7 is equal to or more than the second reference value "001".

Figure 22B:
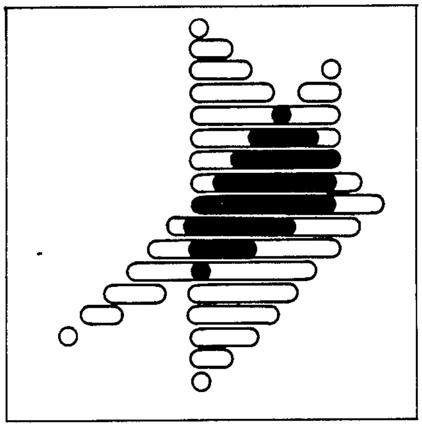

Therefore, filled in this case are only the regions in which two or more figures are overlapped. When such processing is performed with respect to the figures as shown in FIG. 15, record data are obtained in which a figure IBDJG is filled along the sequence of the scanning lines as shown in FIG. 22B. It is also possible to fill only regions in which N (N: integer) or more figures are overlapped by changing the first and second reference values to binary numbers expressing N and $(N-1)$, respectively.

Since the logical product of the signals 107 and 140 is obtained in the output signal generator 11 as shown in FIG. 20, filling of specific points having overlapped numbers less than a prescribed number can be avoided in case of performing filling only when figures equal to or more than the prescribed number are overlapped.

Further, it is also possible to apply such modification of extracting the output signal 108 from an equal output terminal (not shown) of the comparator 9 while maintaining the first and second reference values set in the reference register 8 at "001" and "000" respectively. In this case, the output signal 108 from the comparator 9 becomes "1" only when the output from the accumulator 7 is "001" and the signal 140 becomes "1" when the output from the accumulator 7 is equal to or more than "000". Therefore, record data are obtained as shown in FIG. 22c, which are filled only in inner regions with no overlapping of the figures.

Figure 8G:
Figure 22C:
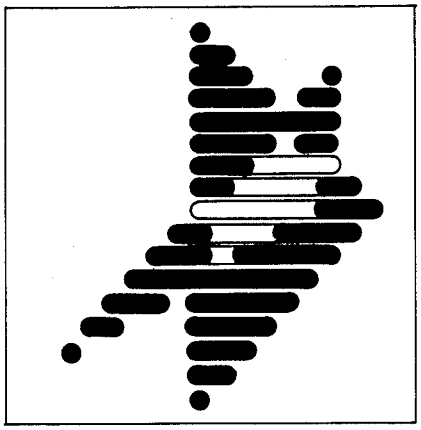

When the aforementioned processing is applied to the figures as shown in FIG. 8C, FIGS. 8D to 8F corresponding to FIGS. 22A to 22C are obtained. When no figures are overlapped and only one figure (FIG. 8A, for example) is recorded in accordance with the present invention, the recording is made in a ordinary form as shown in FIG. 8G.

Therefore, systematic processing is possible by providing mode data to segments regardless of overlapping of figures, whereby the present apparatus is simplified in handling in comparison with conventional ones. For example, consider such case that, a figure in the size of 840 mm $\times$600 mm is processed in the units of pixels of 25 $\mu$m $\times$25 $\mu$m. When the entire image with respect to such figure is expanded to pixels and all of which are stored in a memory, storage capacity is required for the memory corresponding to about $8.4 \times 10^2 \times 40 \times \not\equiv \times 10^2 \times 40$ = about $8 \times 10^8$ pixels. On the other hand, the storage capacity of the RAMs 4a and 4b as shown in FIG. 6 for one scanning line may correspond to about $3.4 \times 10^4$ pixels, and hence the required capacity of the RAMs 4a and 4b may be far less than that of above described conventional case, not only in the case of providing the RAMs 4a and 4b with storage capacity for one scanning line but providing the same with capacity capable of containing several scanning lines.

With respect to the character data, as shown in FIG. 8A, for example, that displayed by 480 $\times$480 dots for one character is processed as the standard size and the coordinates of the vertices of the polygons approximating the character are stored in memory in the form retrievable by character codes. Then, it is also possible to output those obtained by enlarging or reducing the standard data or those subjected to processing such as elongation, flattening, inclination, rotation and the like. In this case, the standard data are read by the character codes from the memory to perform arithmetic corresponding to the aforementioned processing on the standard data to obtain new vertex coordinate values thereby to perform the processing in the aforementioned embodiment on the basis of the said new values, whereby desired recording is performed.

Thus, according to the method of the present invention, the image data of the polygons can be obtained by simply providing the respective vertex coordinates of the respective polygons without performing complicated calculation, whereby image data processing can be performed at a high speed. Further, the processing of obtaining, e.g., the figure as shown in FIG. 8E cannot be performed unless the respective coordinates of both figures as shown in FIGS. 9A and 9B are provided in the conventional method of calculating the coordinates of intersection points, while both figures may not be simultaneously provided in the processing method of the present invention, and the processing may be performed in the order of data reaching to the recording system. Thus, the wait time for the data reaching may be reduced.

Further, the processing can be performed through use of simple devices such as the comparator, the accumulator and the detector, whereby the circuit itself can be subjected to high speed operation. Sequential record data along scanning lines can be readily obtained in arbitrary overlapping parts of the figures formed by overlapping of figures by merely changing the values to be registered in the register, specifications of the comparator and the write data producing circuit, the code for the specific point and the like.

According to this method, images formed by $(2^{n-1}-1)$ or less overlapped figures can be treated by n-bit numerical data, and hence efficiency of describing the overlapping mode with respect to the bit numbers of the RAMs is improved to effectively utilize the memory capacity.

Further the first embodiment can be generalized, for example, such that characters and figures may be separated into geometrically independent parts previously, thereby to combine the same in the aforementioned operation to obtain raster outputs of desired characters and figures.

SECOND EMBODIMENT (D) Summary of Second Embodiment

Figure 23:
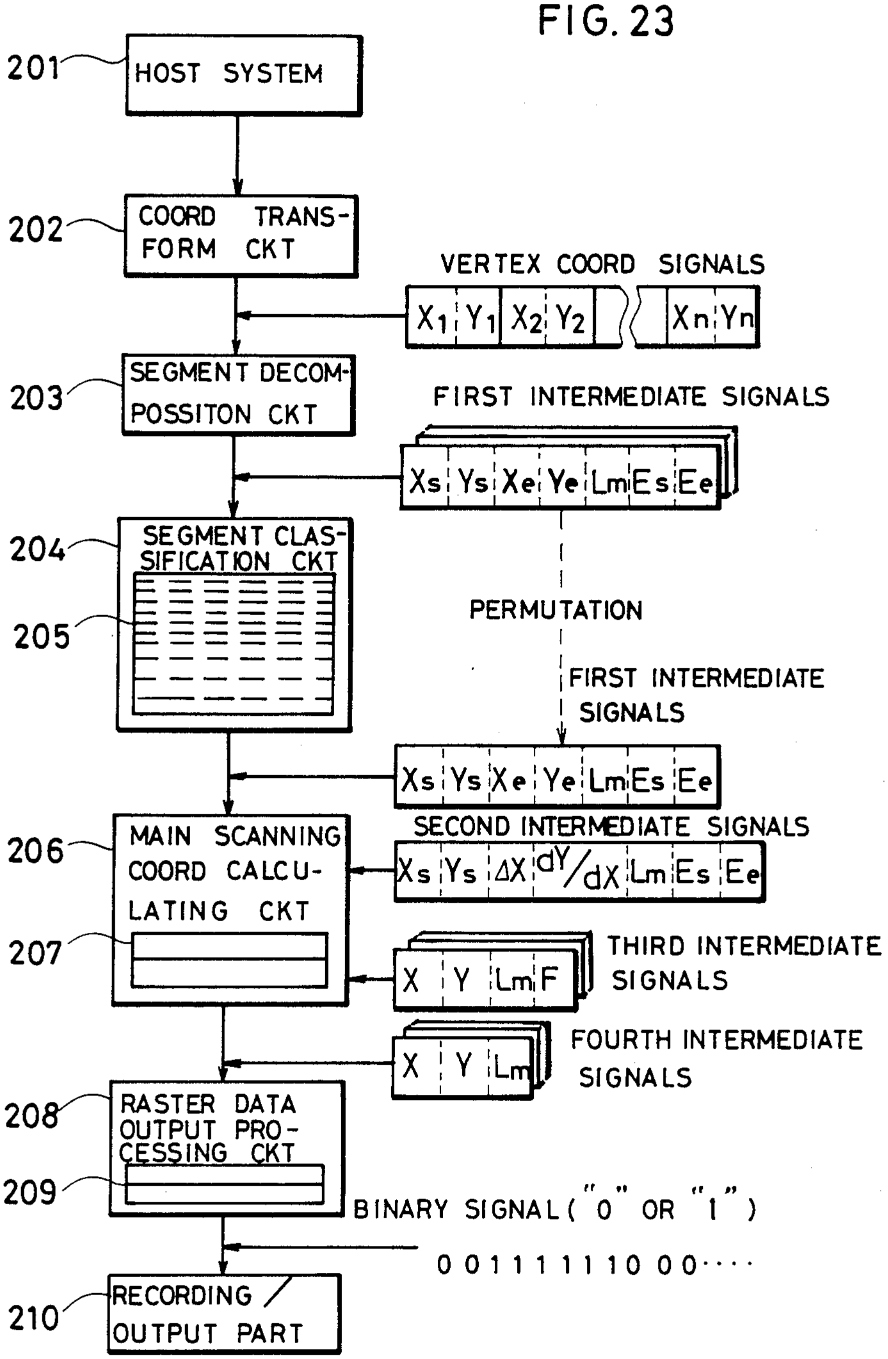
FIG. 23 is a block diagram schematically showing structure of a second embodiment of the present invention.
Figure 24A:
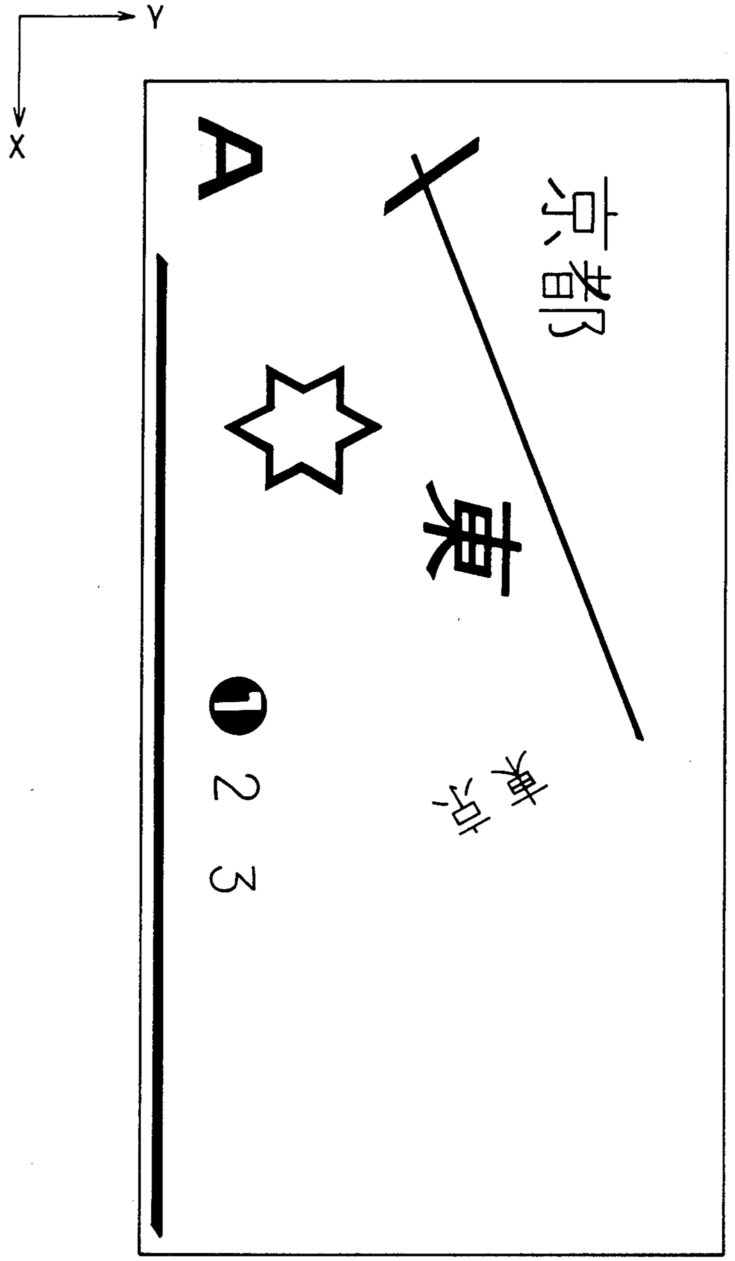
FIGS. 24A and 24B are diagrams showing images to be recorded in the second embodiment.

FIG. 23 is a block diagram showing a second embodiment of the present invention, and this embodiment is characterized in that mode providing processing is performed in a different form from that of the first embodiment. In this embodiment, an image to be recorded is considered as that shown in FIG. 24A, which is formed by a plurality of characters and figures. The respective characters and figures as shown in FIG. 24A are expressed by polygons.

Referring to FIG. 23, a host system 201 and a coordinate thansformation circuit 202 are operated in software processing. In the host system 201, vertex coordinate values of arbitrary polygons are inputted by a digitizer (not shown) etc. On the other hand, as to fixed characters/figures such as digital fonts, character codes assigned to the said characters and recording positions are inputted thereby to read out vertex coordinate values of the characters approximated by polygons from the memory in which the coordinates are previously stored.

The coordinate transformation circuit 202 performs rotation, deformation and the like of the polygons in response to designation from the host system 201, to calculate vertex coordinate values of each polygon on a recording plane.

In addition to the above, the host system 201 detects progress of recording/scanning to output polygonal data substantially in sequence of the recording/scanning. Such operation is performed in a processing time longer than that required for recording in the sequence of scanning, since data of highly concentrated information are treated in the former. Then, signals indicating vertex coordinate values on the recording plane are transmitted to a segment decomposition circuit 203 per polygon.

The segment decompositon circuit 203, a segment classification circuit 204 and a main scanning coordinate calculating circuit 206 in a subsequent stage correspond to a principal part of the second embodiment, details of which are hereinafter described.

A raster data output processing circuit 208 is adapted to provide raster outputs on the basis of inputted signals, and has functions similar to those of the write data producing circuit 3 to the output signal generator 11 in the first embodiment (FIG. 6). The raster data output processing circuit 208 is also hereinafter described in detail.

Figures 25, 27:
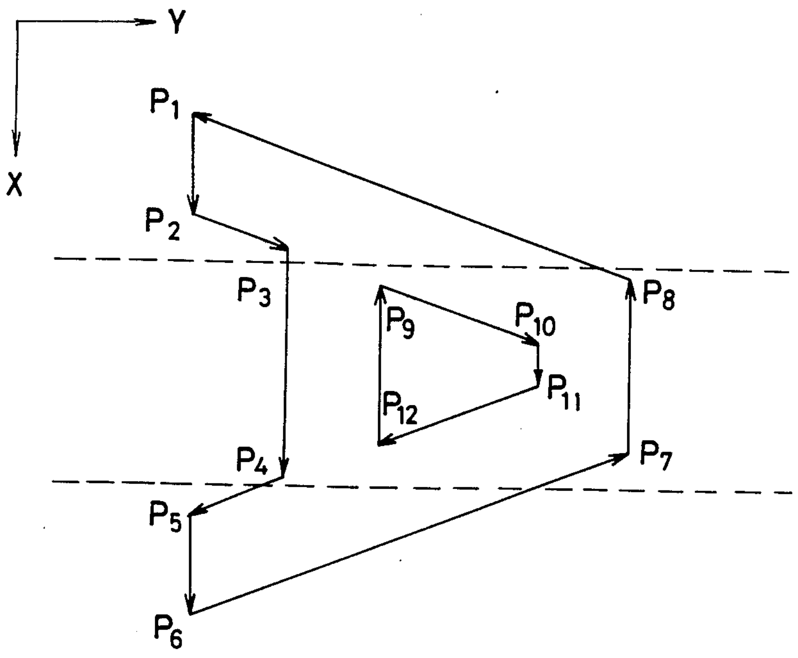
FIG. 25 is a diagram showing vertex coordinates of a character "A" as expressed by polygons.

Within these components, the segment decomposition circuit 203 receives signals expressing coordinates of vertices of a polygon from the coordinate transformation circuit 202. An example of such figure is shown in FIG. 25, which is obtained by extracting only a character "A" from the image as shown in FIG. 24A. Then the segment decompostion circuit 203 decomposes the figure to segments and, on the basis of coordinate data for continuous four apexes $P_{i-1}$ to $P_{i+1}$, provides data expressing characteristics of a segment $\overline{P_iP_{i+1}}$ connecting two intermediate vertices thereof and outputs the same as first intermediate signals.

The first intermediate signals are formed by the following data:

record start point coordinates: $X_s$, $Y_s$
record end point coordinates: $X_3$, $Y_e$
segment mode: $L_m$
record start point flag: $E_s$
record end point flag: $E_e$, In these data, the record start point coordinates $X_s$ and $Y_s$ are the coordinates of, in both terminal points of the said segment $\overline{P_iP_{i+1}}$, the one which the scanning line reaches first while the recording end point coordinates $X_e$ and $Y_e$ are the coordinates of the other terminal point which the scanning line finally reaches. The segment mode $L_m$ is a data indicating whether the segment $\overline{P_iP_{i+1}}$ is in a raster start mode (mode 1) or a raster end mode (mode 2), or does not correspond to either modes. The record start and end point flags $E_s$ and $E_e$ are assigned depending on the positional relation between the segment and other segments adjacent thereto in order to indicate processing of the terminal points of the said segment, and are determined in accordance with a rule as hereinafter decribed.

The segment decomposition circuit 203 produces, with respect to polygons sequentially transmitted from the host system 201, the first intermediate signals for all of the segments forming the respective sides of every polygon, and then transmits the first intermediate signals to the segment classification circuit 204.

The respective first intermediate signals are thereafter independently processed regardless of the portion of the polygon from which the segment is obtained.

The segment classification circuit 204 permutes the first intermediate signals received from the segment decomposition circuit 203 along the sequence of scanning in recording in the unit of the capacity of subdivided classification memory as hereinafter described.

Figure 24B:
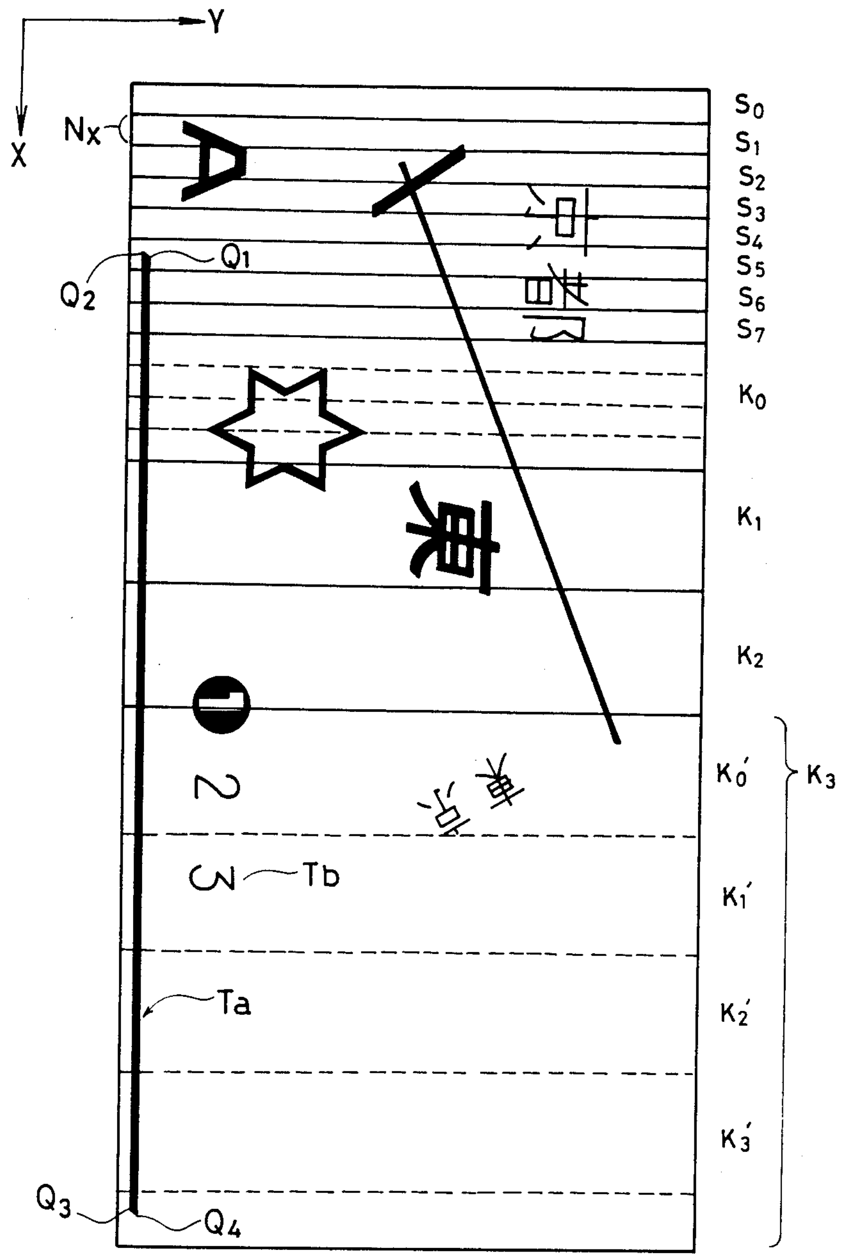

In order to perform permutation along the sequence of scanning, the segment classification circuit 204 includes a memory 205, which has a plurality of the subdivided classification memories ordered in correspondence to the sequence of scanning in recording and a plurality of carryover classification memories. FIG. 24B shows respective order and storage ranges of the subdivided classifcation memories $S_0$ to $S_7$ and the carryover classification memories $K_0$ to $K_3$. It is to be noted that the storage ranges of the memories are sequentially changed with progress of the recording, as hereinafter described. The first intermediate signals are stored in any of the classification memories in accordance with the storage ranges of the classification memories to which coordinate signals $X_s$ belong.

The memory 205 in the segment classification circuit 204 sequentially stores the first intermediate signals decomposed into a plurality of segments per polygon.

After the first intermediate signals required for correct recording are completely stored in the memory 205, the first intermediate signals are read from a subdivided classification memory corresponding to a region first recorded. When the subdivided classification memory is vacated, the first intermediate signals are read from a subsequent subdivided classification memory in the recording sequence. The first intermediate signals are random in order in each subdivided classification memory, while the same are classified in the sequence of recording in the units of the subdivided classification memories.

The first intermediate signals thus read in the sequence of recording in the units of the subdivided classification memories are transmitted one by one to the main scanning coordinate calculating circuit 206. The main scanning coordinate calculating circuit 206 performs arithmetic on parts of the first intermediate signals transmitted from the segment classifcation circuit 204 and converts the first intermediate signals thereby to produce second intermediate signals expressing positions, directions and the like of the respective segments of the polygons.

The second intermediate signals are formed by the following data:

record start point coordinate: $X_s$, $Y_s$
number of vertical scanning lines of segment: $\Delta X$
coefficient of inclination: $dY/dX$
segment mode: $L_m$
record start point flag: $E_s$
record end point flag: $E_e$ Where the number $\Delta X$ of the vertical scanning lines of segment is obtained by subtracting one from the number of the vertical scanning lines required to entirely scan the segment.

Then the second intermediate signals are subjected to arithmetic conversion to be changed to a train of third intermediate signals. The third intermediate signals are adapted to indicate a point train formed by respective points at which the respective points of the polygons intersect with the main scanning lines. The order of respective points is determined by permitting the respective points along the sequence of vertical scanning.

The third intermediate signals are formed by the following data:

coordinates of intersection points: X, Y
segment mode: $L_m$
flag: F

In each train of the third intermediate signals, the flag F of the initial third intermediate signal corresponding to the record start point is "$E_s$" and the flag F for the middle third intermediate signal is "1", while the flag F for the last third intermediate signal corresponding to the record end point is "$E_e$".

When the flag F is "1", the third intermediate signals are changed to fourth intermediate signals. The fourth intermediate signals are formed by the following data:

coordinates of intersection points: X, Y
segment mode: $L_m$

The fourth intermediate signals are transmitted to the raster data output processing circuit 208. The raster data output processing circuit 208 converts the fourth intermediate signals into binary signals which are readily employed as recording signals. The binary signals are inputted in a recording/output part 210, which in turn records reproduced images.

(E) Details of Second Embodiment (E-1) Details of Segment Decomposition Circuit 203

Figure 26:
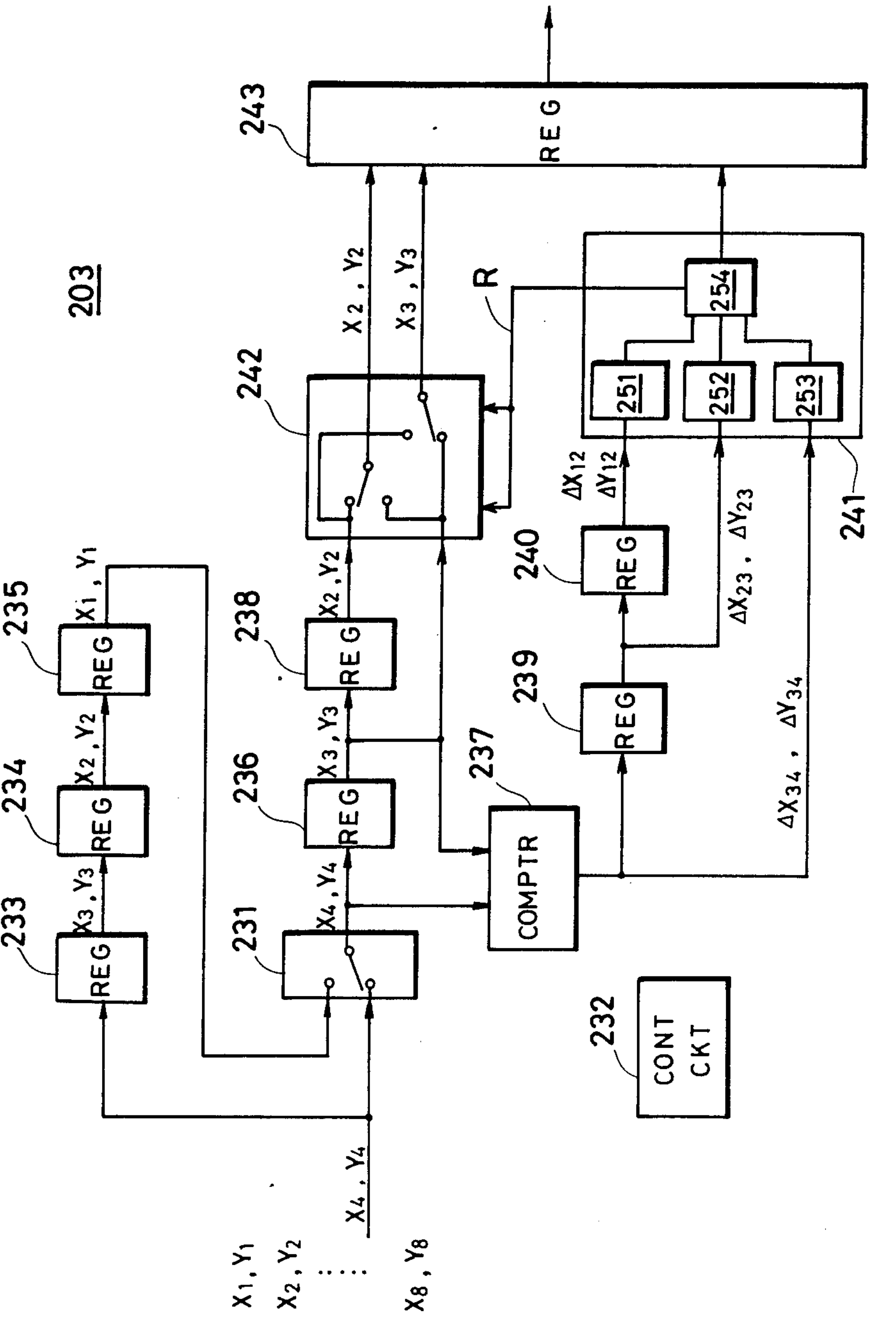
FIG. 26 is a block diagram showing an example of structure of a segment decomposition circuit as shown in FIG. 23.

FIG. 26 is a diagram showing the segment decomposition circuit 203 in detail and FIG. 25 shows anticlockwise polygons $P_1P_2 \ldots P_8$ and $P_9P_{10}P_{11}P_{12}$ as examples of the polygons to be recorded in this embodiment.

As shown in FIG. 26, the segment decomposition circuit 203 is formed by selectors 231 and 242, registers 233, 234, 235, 236, 238, 239 and 240, a comparator 237, a control circuit 232, a mode deciding circuit 241 and an output register 243.

In the segment decomposition circuit 203, first the respective coordinate data $(X_1, Y_1)$, $(X_2, Y_2) \ldots (X_8, Y_8)$ of the polygon $P_1P_2 \ldots P_8$ are sequentially inputted through the selector 231 and the register 233.

Then, description is now made from a state in which the coordinate data of the vertex $P_1$, $P_2$, $P_3$ and $P_4$ are already inputted from the coordinate transformation circuit 202. At this time, the registers 235, 234 and 233 already receive the first three coordinate data $(X_1, Y_1)$, $(X_2, Y_2)$ and $(X_3, Y_3)$ thereby to hold/output the first three coordinate data respectively, which holding/output are performed until the last coordinate data $P_8$ $(X_8, Y_8)$ are inputted.

On the other hand, the registers 238 and 236 respectively hold/output the coordinate data $(X_2, Y_2)$ and $(X_3, Y_3)$. The coordinate data $(X_4, Y_4)$ are being outputted from the selector 231. The comparator 237 compares the output data of the register 236 with data inputted through the selector 231 at that time to output data $\Delta X_{34} (=X_4-X_3)$ and $\Delta Y_{34} (=Y_4-Y_3)$.

The registers 240 and 239 respectively output the following four data as the results of the last comparison and the last comparison but one in the comparator 237 to the mode deciding circuit 241:

$$\Delta X_{12} (=X_2-X_1),\ \Delta Y_{12} (=Y_2-Y_1)$$

$$\Delta X_{23} (=X_3-X_2),\ \Delta Y_{23} (=Y_3-Y_2)$$

further, directly supplied to the mode deciding circuit 241 are the following results of comparison in the comparator 237 at that time:

$$\Delta X_{34} (=X_4-X_3),\ \Delta Y_{34} (=Y_4-Y_3)$$

The mode deciding circuit 241 is formed by ROMs 251, 252, 253 and 254. As shown in FIG. 27, the ROMs 251, 252 and 253 are adapted to supply outputs $G(\overline{P_iP_{i+1}})$ in response to the input indicating three states (+, − and 0) with respect to the signs of the inputs $\Delta X$ and $\Delta Y$. In other words, the signals $G(\overline{P_iP_{i+1}})$ function as indexes indicating whether or not the segment $\overline{P_iP_{i+1}}$ has components along the vertical scanning direction or a reverse direction and, when the same has no such components, whether the same is parallel or antiparallel to the main scanning direction.

In the example as shown in FIG. 25, $$(\Delta X_{12}, \Delta Y_{12})=(+, 0),$$

$$(\Delta X_{23}, \Delta Y_{23})=(+, +),$$

$$(\Delta X_{34}, \Delta Y_{34})=(+, 0),$$

and hence all of $\overline{P_1P_2}$, $\overline{P_2P_3}$ and $\overline{P_3P_4}$ have components in the vertical scanning direction. Therefore, "2", "2" and "2" are supplied respectively as $G(\overline{P_{i-1}P_i})$, $G(\overline{P_iP_{i+1}})$ and $G(\overline{P_{i+1}P_{i+2}})$ from FIG. 27. these values are outputted from the ROMs 251, 252 and 253.

The ROM 254 is adapted to be in input/output relation as shown in Table 1 or Table 2, to receive the aforementioned outputs from the ROMs 251, 252 and 253 thereby to output data about the segment $P_2P_3$. Namely, with reference to $P_1$ to $P_4$ in FIG. 25, the data with respect to the characteristics of the intermediate segment $\overline{P_2P_3}$ is provided on the basis of attributes of the three segments $\overline{P_1P_2}$, $\overline{P_2P_3}$ and $\overline{P_3P_4}$ formed by four continuous vertices.

TABLE 1

| | | ANTICLOCKWISE ROTATION | | | | | | | | | | | | | | | | | | | | | | | | | | | | | | | |
|---|---|---|---|---|---|---|---|---|---|---|---|---|---|---|---|---|---|---|---|---|---|---|---|---|---|---|---|---|---|---|---|---|---|
| $G(\overline{P_{i-1}P_i})$ | | 1 | 1 | 1 | 1 | 2 | 2 | 2 | 2 | 3 | 3 | 3 | 3 | 4 | 4 | 4 | 4 | 1 | 1 | 1 | 1 | 2 | 2 | 2 | 2 | 3 | 3 | 3 | 3 | 4 | 4 | 4 | 4 |
| $G(\overline{P_iP_{i+1}})$ | | 1 | 1 | 1 | 1 | 1 | 1 | 1 | 1 | 1 | 1 | 1 | 1 | 1 | 1 | 1 | 1 | 2 | 2 | 2 | 2 | 2 | 2 | 2 | 2 | 2 | 2 | 2 | 2 | 2 | 2 | 2 | 2 |
| $G(\overline{P_{i+1}P_{i+2}})$ | | 1 | 2 | 3 | 4 | 1 | 2 | 3 | 4 | 1 | 2 | 3 | 4 | 1 | 2 | 3 | 4 | 1 | 2 | 3 | 4 | 1 | 2 | 3 | 4 | 1 | 2 | 3 | 4 | 1 | 2 | 3 | 4 |
| | Lm | 0 | 0 | 2 | 0 | 0 | 0 | 2 | 0 | 0 | 0 | 2 | 0 | 0 | 0 | 2 | 0 | 1 | 1 | 1 | 1 | 1 | 1 | 1 | 1 | 1 | 1 | 1 | 1 | 1 | 1 | 1 | 1 |
| CHARACTERISTICS | Es | — | — | 1 | — | — | — | 1 | — | — | — | 1 | — | — | — | 1 | — | 0 | 0 | 0 | 0 | 1 | 1 | 1 | 1 | 1 | 1 | 1 | 1 | 1 | 1 | 1 | 1 |
| OF SEGMENT $P_iP_{i+1}$ | Ee | — | — | 0 | — | — | — | 0 | — | — | — | 0 | — | — | — | 0 | — | 1 | 0 | 0 | 1 | 1 | 0 | 0 | 1 | 1 | 0 | 0 | 1 | 1 | 0 | 0 | 1 |
| | R | — | — | 0 | — | — | — | 0 | — | — | — | 0 | — | — | — | 0 | — | 1 | 1 | 1 | 1 | 1 | 1 | 1 | 1 | 1 | 1 | 1 | 1 | 1 | 1 | 1 | 1 |
| $G(\overline{P_{i-1}P_i})$ | | 1 | 1 | 1 | 1 | 2 | 2 | 2 | 2 | 3 | 3 | 3 | 3 | 4 | 4 | 4 | 4 | 1 | 1 | 1 | 1 | 2 | 2 | 2 | 2 | 3 | 3 | 3 | 3 | 4 | 4 | 4 | 4 |
| $G(\overline{P_iP_{i+1}})$ | | 3 | 3 | 3 | 3 | 3 | 3 | 3 | 3 | 3 | 3 | 3 | 3 | 3 | 3 | 3 | 3 | 4 | 4 | 4 | 4 | 4 | 4 | 4 | 4 | 4 | 4 | 4 | 4 | 4 | 4 | 4 | 4 |
| $G(\overline{P_{i+1}P_{i+2}})$ | | 1 | 2 | 3 | 4 | 1 | 2 | 3 | 4 | 1 | 2 | 3 | 4 | 1 | 2 | 3 | 4 | 1 | 2 | 3 | 4 | 1 | 2 | 3 | 4 | 1 | 2 | 3 | 4 | 1 | 2 | 3 | 4 |
| | Lm | 1 | 0 | 0 | 0 | 1 | 0 | 0 | 0 | 1 | 0 | 0 | 0 | 1 | 0 | 0 | 0 | 2 | 2 | 2 | 2 | 2 | 2 | 2 | 2 | 2 | 2 | 2 | 2 | 2 | 2 | 2 | 2 |
| CHARACTERISTICS | Es | 1 | — | — | — | 1 | — | — | — | 1 | — | — | — | 1 | — | — | — | 1 | 1 | 0 | 0 | 1 | 1 | 0 | 0 | 1 | 1 | 0 | 0 | 1 | 1 | 0 | 0 |
| OF SEGMENT $\overline{P_iP_{i+1}}$ | Ee | 0 | — | — | — | 0 | — | — | — | 0 | — | — | — | 0 | — | — | — | 0 | 0 | 0 | 0 | 1 | 1 | 1 | 1 | 1 | 1 | 1 | 1 | 1 | 1 | 1 | 1 |
| | R | 0 | — | — | — | 0 | — | — | — | 0 | — | — | — | 0 | — | — | — | 0 | 0 | 0 | 0 | 0 | 0 | 0 | 0 | 0 | 0 | 0 | 0 | 0 | 0 | 0 | 0 |

Lm = SEGMENT MODE
Es = RECORD START POINT FLAG
Ee = RECORD END POINT FLAG
R = LARGE-AND-SMALL INDICATION FLAG

TABLE 2

CLOCKWISE ROTATION (columns 1–16)

| | | | | | | | | | | | | | | | | | |
|---|---|---|---|---|---|---|---|---|---|---|---|---|---|---|---|---|---|
| $G(\overline{P_{i-1}P_i})$ | | 1 | 1 | 1 | 1 | 2 | 2 | 2 | 2 | 3 | 3 | 3 | 3 | 4 | 4 | 4 | 4 |
| $G(\overline{P_iP_{i+1}})$ | | 1 | 1 | 1 | 1 | 1 | 1 | 1 | 1 | 1 | 1 | 1 | 1 | 1 | 1 | 1 | 1 |
| $G(\overline{P_{i+1}P_{i+2}})$ | | 1 | 2 | 3 | 4 | 1 | 2 | 3 | 4 | 1 | 2 | 3 | 4 | 1 | 2 | 3 | 4 |
| | Lm | 0 | 0 | 2 | 0 | 0 | 0 | 2 | 0 | 0 | 0 | 2 | 0 | 0 | 0 | 2 | 0 |
| CHARACTERISTICS | Es | — | — | 1 | — | — | — | 1 | — | — | — | 1 | — | — | — | 1 | — |
| OF SEGMENT $\overline{P_iP_{i+1}}$ | Ee | — | — | 0 | — | — | — | 0 | — | — | — | 0 | — | — | — | 0 | — |
| | R | — | — | 0 | — | — | — | 0 | — | — | — | 0 | — | — | — | 0 | — |
| $G(\overline{P_{i-1}P_i})$ | | 1 | 1 | 1 | 1 | 2 | 2 | 2 | 2 | 3 | 3 | 3 | 3 | 4 | 4 | 4 | 4 |
| $G(\overline{P_iP_{i+1}})$ | | 3 | 3 | 3 | 3 | 3 | 3 | 3 | 3 | 3 | 3 | 3 | 3 | 3 | 3 | 3 | 3 |
| $G(\overline{P_{i+1}P_{i+2}})$ | | 1 | 2 | 3 | 4 | 1 | 2 | 3 | 4 | 1 | 2 | 3 | 4 | 1 | 2 | 3 | 4 |
| | Lm | 1 | 0 | 0 | 0 | 1 | 0 | 0 | 0 | 1 | 0 | 0 | 0 | 1 | 0 | 0 | 0 |
| CHARACTERISTICS | Es | 1 | — | — | — | 1 | — | — | — | 1 | — | — | — | 1 | — | — | — |
| OF SEGMENT $\overline{P_iP_{i+1}}$ | Ee | 0 | — | — | — | 0 | — | — | — | 0 | — | — | — | 0 | — | — | — |
| | R | 0 | — | — | — | 0 | — | — | — | 0 | — | — | — | 0 | — | — | — |

CLOCKWISE ROTATION (columns 17–32)

| | | | | | | | | | | | | | | | | | |
|---|---|---|---|---|---|---|---|---|---|---|---|---|---|---|---|---|---|
| $G(\overline{P_{i-1}P_i})$ | | 1 | 1 | 1 | 1 | 2 | 2 | 2 | 2 | 3 | 3 | 3 | 3 | 4 | 4 | 4 | 4 |
| $G(\overline{P_iP_{i+1}})$ | | 2 | 2 | 2 | 2 | 2 | 2 | 2 | 2 | 2 | 2 | 2 | 2 | 2 | 2 | 2 | 2 |
| $G(\overline{P_{i+1}P_{i+2}})$ | | 1 | 2 | 3 | 4 | 1 | 2 | 3 | 4 | 1 | 2 | 3 | 4 | 1 | 2 | 3 | 4 |
| | Lm | 1 | 1 | 1 | 1 | 1 | 1 | 1 | 1 | 1 | 1 | 1 | 1 | 1 | 1 | 1 | 1 |
| CHARACTERISTICS | Es | 1 | 1 | 0 | 1 | 1 | 1 | 0 | 1 | 1 | 1 | 0 | 1 | 1 | 1 | 0 | 1 |
| OF SEGMENT $\overline{P_iP_{i+1}}$ | Ee | 0 | 0 | 1 | 1 | 0 | 0 | 1 | 1 | 0 | 0 | 1 | 1 | 0 | 0 | 1 | 1 |
| | R | 0 | 0 | 0 | 0 | 0 | 0 | 0 | 0 | 0 | 0 | 0 | 0 | 0 | 0 | 0 | 0 |
| $G(\overline{P_{i-1}P_i})$ | | 1 | 1 | 1 | 1 | 2 | 2 | 2 | 2 | 3 | 3 | 3 | 3 | 4 | 4 | 4 | 4 |
| $G(\overline{P_iP_{i+1}})$ | | 4 | 4 | 4 | 4 | 4 | 4 | 4 | 4 | 4 | 4 | 4 | 4 | 4 | 4 | 4 | 4 |
| $G(\overline{P_{i+1}P_{i+2}})$ | | 1 | 2 | 3 | 4 | 1 | 2 | 3 | 4 | 1 | 2 | 3 | 4 | 1 | 2 | 3 | 4 |
| | Lm | 2 | 2 | 2 | 2 | 2 | 2 | 2 | 2 | 2 | 2 | 2 | 2 | 2 | 2 | 2 | 2 |
| CHARACTERISTICS | Es | 1 | 1 | 1 | 1 | 1 | 1 | 1 | 1 | 0 | 0 | 0 | 0 | 1 | 1 | 1 | 1 |
| OF SEGMENT $\overline{P_iP_{i+1}}$ | Ee | 0 | 1 | 1 | 0 | 0 | 1 | 1 | 0 | 0 | 1 | 1 | 0 | 0 | 1 | 1 | 0 |
| | R | 1 | 1 | 1 | 1 | 1 | 1 | 1 | 1 | 1 | 1 | 1 | 1 | 1 | 1 | 1 | 1 |

Lm = SEGMENT MODE
Es = RECORD START POINT FLAG
Ee = RECORD END POINT FLAG
R = LARGE-AND-SMALL INDICATION FLAG

The segment mode $L_m$ is assigned as "1", "2" or "0" respectively in response to whether points on the segments are in raster start mode or raster end mode, or if the point do not correspond to either modes. With respect to anticlockwise rotation, for example, it expresses such relation that the segment $\overline{P_iP_{i+1}}$ is a raster start point ($L_m=1$) when $G(\overline{P_iP_{i+1}})$ is "2" (i.e., the segment $\overline{P_iP_{i=1}}$ has components in an X direction) while the Segment $\overline{P_iP_{i+1}}$ is a raster end point ($L_m=2$) when $G(\overline{P_iP_{i+1}}$ is "4" (i.e., the segment $P_iP_i+_1$ has components in a direction reverse to X). When $G(P_iP_{i+1})$ is "1" or "3", the segment is parallel or anti-parallel to the main scanning direction and corresponds to neither raster start nor end points, and hence $L_m$ is set to "0" in principle.

The record start and end point flags $E_s$ and $E_e$ are provided, when the segment mode $L_m$ is "1" or "2", in order to indicate treatment of the terminal points of the said segment in response to positional and directional relation between the segment and other segments adjacent thereto.

These flags have the following significance: First, the case is considered where independent signals with no such flags are provided for respective segments. When, in this case, the respective segments are finally combined to obtain data, a vertex (e.g., $P_4$ in FIG. 25) is doubly designated by both of two segments ($\overline{P_3P_4}$ and $\overline{P_4P_5}$) holding the same, whereby the record start mode (or the record end mode) is accumulated twice at this point.

However, the accumulation of the record start mode must be performed only once at such a point similarly to the first embodiment, and hence this vertex must be designated with respect to only one of the two segments.

Thus, this embodiment is so structured that flags are provided to both terminal points of the respective segments and each vertex is designated from only one segment in accordance with the flags. In other words, each vertex is designated by a flag of "1" in one of two segments holding the vertex while the vertex is designated by a flag of "0" in the other segment. The fourth intermediate signal as hereinafter described is supplied to the vertex from only the segment assigned with a flag of "1". With reference to the aforementioned example, $P_4$ is assigned with a flag of "0" in the segment $\overline{P_3P_4}$ and is assigned with a flag of "1" in the segment $\overline{P_4P_5}$, so as to supply the fourth intermediate signal only for $P_4$ from the segment $\overline{P_4P_5}$.

However, boundary point between the record start and ending modes (e.g., $P_1$ in FIG. 25) must be considered as specific point similar to those in the first embodiment, and hence allowed is double designation from both segments (i.e., designation by the flag of "1" in both of the segments).

Columns of record start and end point flags in Tables 1 and 2 have been prepared in accordance with this principle. It is to be noted that the record start point flags indicate flags with respect to the record start points and the record end point flags indicate those with respect to the record end points.

Large-and-small indication flag R is adapted to express large-and-small relation in the respective X coordinates of two terminal points $P_i$ and $P_{i+1}$, by being "1" only when the X coordinate of $P_{i+1}$ is larger than that of $P_i$ and being "0" in the other case. This is used to determine output sequence of respective X and Y coordinates of $P_i$ and $P_{i+1}$. Further determined in accordance with this flag R is which one of $P_i$ and $P_{i+1}$ corresponds to the record start or end point.

When, for example, the segment $\overline{P_2P_3}$ in FIG. 25 is subjected to conversion along the conversion characteristics shown in Table 1, the ROM 254 outputs the segment mode $L_m=1$ the record start point flag $E_s=1$, the record end point flag $E_e=0$ and the large-and-small indication flag $R=1$.

The large-and-small indication flag R is inputted in the selector 242, which in turn outputs the coordinate data in the registers 238 and 236 in such sequence of the record starting point coordinates ($X_2$, $Y_2$) and the ending point coordinates ($X_3$, $Y_3$) by the fact that the large-and-small indication flag R is "1".

Thus, determined are the first intermediate signals, which are formed by the following data:

recording start point coordinates: $X_2$, $Y_s$
record end point coordinates: $X_3$, $Y_e$
segment mode: $L_m$
record start point flag: $E_s$
record end point flag: $E_e$ Thus, the segment decomposition circuit 203 outputs $X_2$, $Y_2$, $X_3$, $Y_3$, 1, 1 and 0 as the first intermediate signals with respect to the segment $\overline{P_2P_3}$ from the output register 243.

Similarly with respect to the subsequent segments $\overline{P_3P_4}$, $\overline{P_5P_6}$ and $\overline{P_6P_7}$, the first intermediate signals are outputted from the output register 243.

When the coordinates of the last vertex $P_8$ are inputted, the host system 201 outputs an END signal to the control circuit 232. When the first intermediate signals with respect to the segment $\overline{P_6P_7}$ are outputted, the control circuit 232 switches the selector 231, whereby the coordinate data ($X_1$, $Y_1$), ($X_2$, $Y_2$) and ($X_3$, $Y_3$) latched in the registers 235, 234 and 233 are sequentially inputted from the selector 231 following the coordinate data ($X_8$, $Y_8$). Thus, the first intermediate signals are outputted also with respect to $\overline{P_7P_8}$ and $\overline{P_8P_1}$. Table 3 shows the first intermediate signals thus obtained as the output of segment decomposition circuit 203.

Table 3 also shows first intermediate signals similarly obtained with respect to the polygon $P_9P_{10}P_{11}P_{12}$ which is to be exteriorly filled.

TABLE 3

| | $\overline{P_2P_3}$ | $\overline{P_3P_4}$ | $\overline{P_4P_5}$ | $\overline{P_5P_6}$ | $\overline{P_6P_7}$ | $\overline{P_7P_8}$ | $\overline{P_8P_1}$ | $\overline{P_1P_2}$ | $\overline{P_{10}P_{11}}$ | $\overline{P_{11}P_{12}}$ | $\overline{P_{12}P_9}$ | $\overline{P_9P_{10}}$ |
|---|---|---|---|---|---|---|---|---|---|---|---|---|
| $\Delta X_{i-1,i}$ | + | + | + | + | + | − | − | − | + | + | + | − |
| $\Delta Y_{i-1,1}$ | / | / | / | / | / | / | / | / | / | / | / | / |
| $\Delta X_{i,i+1}$ | + | + | + | + | − | − | − | + | + | + | − | + |
| $\Delta Y_{i,i+1}$ | / | / | / | / | / | / | / | / | / | / | / | / |
| $\Delta X_{i+1,i+2}$ | + | + | + | − | − | − | + | + | + | − | + | + |
| $\Delta Y_{i+1,i+2}$ | / | / | / | / | / | / | / | / | / | / | / | / |
| $G(\overline{P_{i-1}P_i})$ | 2 | 2 | 2 | 2 | 2 | 4 | 4 | 4 | 2 | 2 | 2 | 4 |
| $G(\overline{P_iP_{i+1}})$ | 2 | 2 | 2 | 2 | 4 | 4 | 4 | 2 | 2 | 2 | 4 | 2 |
| $G(\overline{P_{i+1}P_{i+2}})$ | 2 | 2 | 2 | 4 | 4 | 4 | 2 | 2 | 2 | 4 | 2 | 2 |
| $L_m$ | 1 | 1 | 1 | 1 | 2 | 2 | 2 | 1 | 1 | 1 | 2 | 1 |
| $E_s$ | 1 | 1 | 1 | 1 | 0 | 0 | 1 | 1 | 1 | 1 | 1 | 1 |
| $E_e$ | 0 | 0 | 0 | 1 | 1 | 1 | 1 | 0 | 0 | 1 | 1 | 0 |

TABLE 3-continued

| | $P_2P_3$ | $P_3P_4$ | $P_4P_5$ | $P_5P_6$ | $P_6P_7$ | $P_7P_8$ | $P_8P_1$ | $P_1P_2$ | $P_{10}P_{11}$ | $P_{11}P_{12}$ | $P_{12}P_9$ | $P_9P_{10}$ |
|---|---|---|---|---|---|---|---|---|---|---|---|---|
| R | 1 | 1 | 1 | 1 | 0 | 0 | 0 | 1 | 1 | 1 | 0 | 1 |
| $X_s$ | $X_2$ | $X_3$ | $X_4$ | $X_5$ | $X_7$ | $X_8$ | $X_1$ | $X_1$ | $X_{10}$ | $X_{11}$ | $X_9$ | $X_9$ |
| $Y_s$ | $Y_2$ | $Y_3$ | $Y_4$ | $Y_5$ | $Y_7$ | $Y_8$ | $Y_1$ | $Y_1$ | $Y_{10}$ | $Y_{11}$ | $Y_9$ | $Y_9$ |
| $X_e$ | $X_3$ | $X_4$ | $X_5$ | $X_6$ | $X_6$ | $X_7$ | $X_8$ | $X_2$ | $X_{11}$ | $X_{12}$ | $X_{12}$ | $X_{10}$ |
| $Y_e$ | $Y_3$ | $Y_4$ | $Y_5$ | $Y_6$ | $Y_6$ | $Y_7$ | $Y_8$ | $Y_2$ | $Y_{11}$ | $Y_{12}$ | $Y_{12}$ | $Y_{10}$ |

Figure 28:
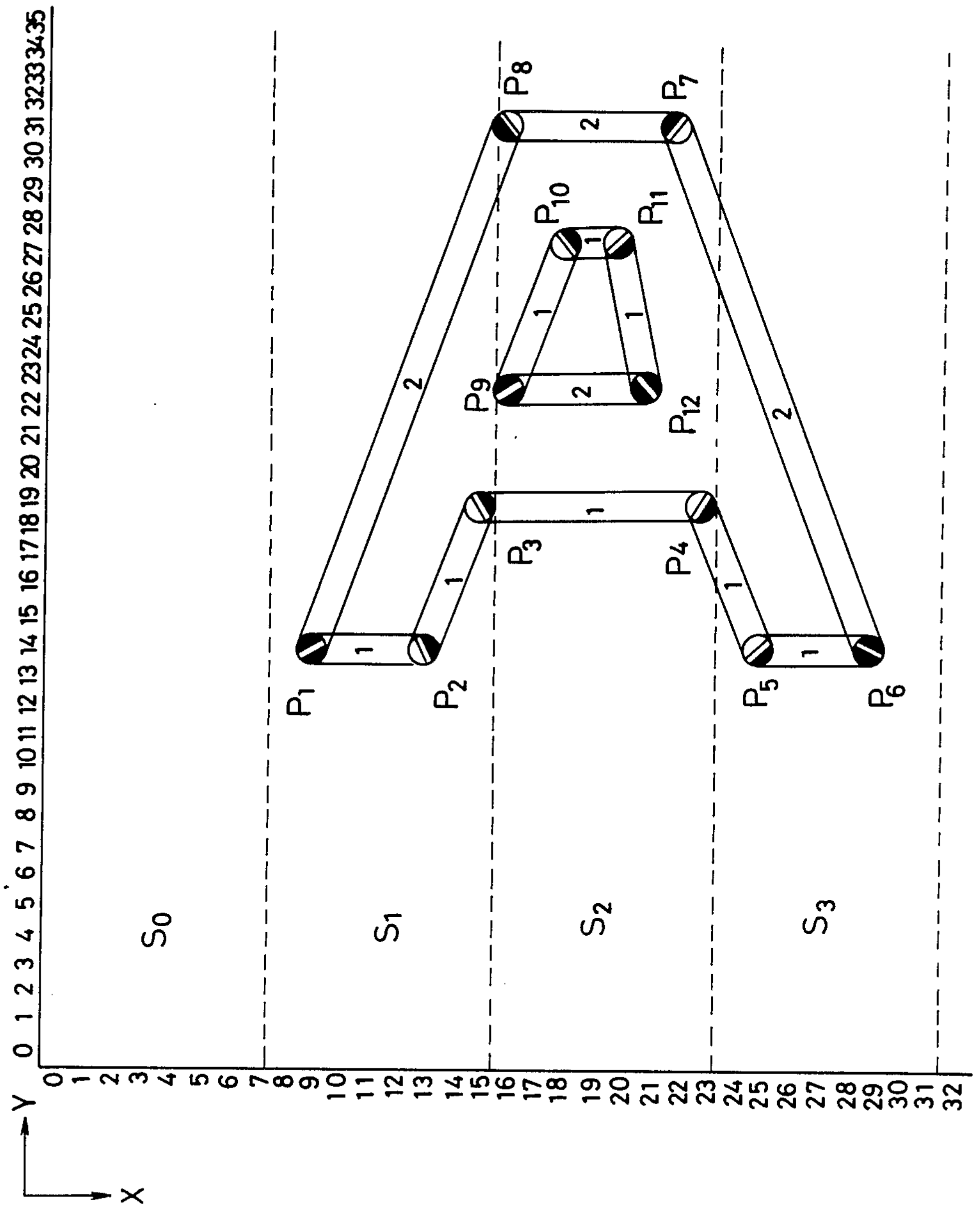
FIG. 28 is a diagram showing the result of providing mode data for the polygons as shown in FIG. 25.

FIG. 28 schematically shows significance of the first intermediate signals obtained in accordance with the aforementioned example. With respect to the segment $\overline{P_2P_3}$, the points $P_2$ and $P_3$ are record start and end points respectively and the numeral "1" between $P_2$ and $P_3$ indicates the segment mode $L_m$ while black and white half circles indicate the flags $E_s=1$ and $E_e=0$ respectively.

(E-2) Details of Segment Classification Circuit 204

Figure 29:
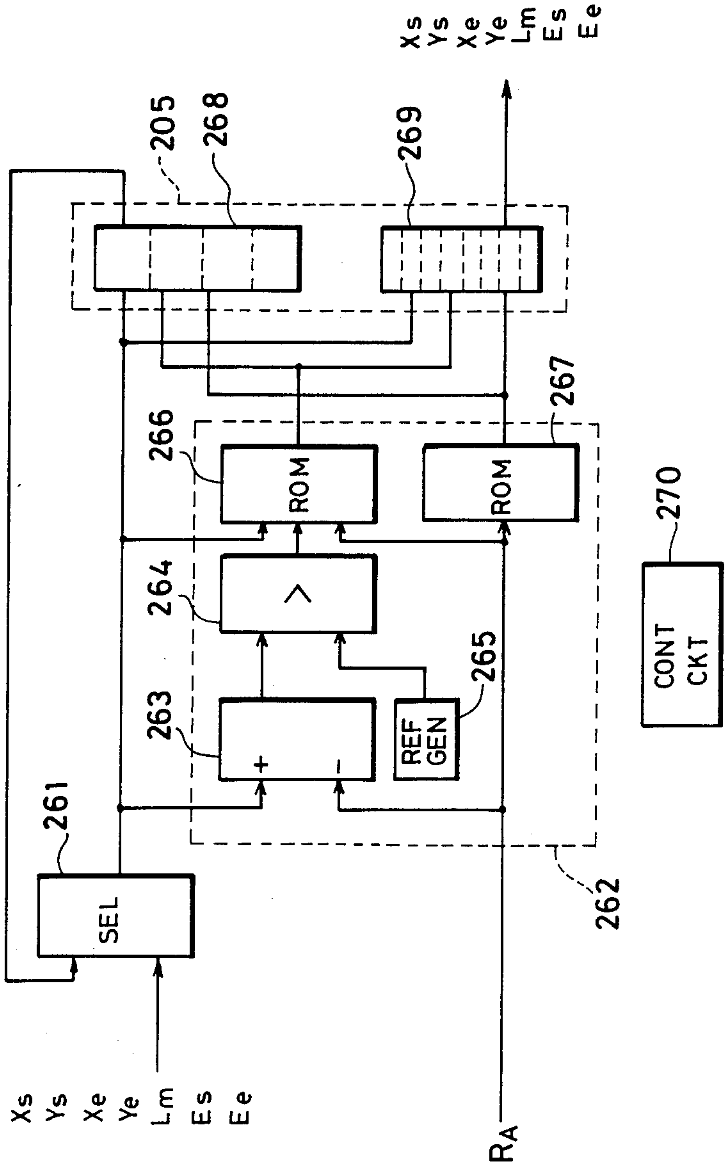
FIG. 29 is a block diagram showing an example of structure of a segment classification circuit as shown in FIG. 23.

FIG. 29 shows the segment classification circuit 204 in detail. The segment classification circuit 204 is formed by the selector 261, a classification memory selecting circuit 262, memory 205 and a control circuit 270. The classification memory selecting circuit 262 is formed by a subtractor 263, a comparator 264, a reference value generator 265 and ROMs (or RAMs) 266 and 267, and the memory 205 is formed by carryover classification memory 268 and subdivided classification memory 269.

The selector 261 receives the first intermediate signals from the segment decomposition circuit 203 or the first intermediate signals returned from the carryover classification memory 268.

The classification memory selecting circuit 262 selects, by $X_s$ of the first intermediate signals, the storage area (classification stack) within the subdivided classification memory 269 or the carryover classification memory 268 included in the memory 205 to which the first intermediate signals are to be stored.

Within the aforementioned components, the subdivided classification memory 269 is adapted to classify and store the segment data as to the segment located in the vicinity of regions in which recording is performed in that time. On the other hand, the carryover classification memory 268 is adapted to classify and store data for the segments not yet subjected to recording at that time, to sequentially transfer the storage contents thereof to the subdivided classification memory 269 with progress of the scanning thereby to subject the stored contents to recording. FIGS. 24B and 30(A) show respective the storage ranges of the subdivided classification memory 268 (consisting of $S_0$ to $S_7$) and the carryover classification memory 268 ($K_0$ to $K_3$) at the starting time of the operation.

In operation, a vertical scanning address $R_A$ currently under recording is subtracted from the coordinate value $X_S$ included in the first intermediate signals at the substractor 263 shown in FIG. 29, whereby to obtain $(X_S-R_A)$. Then the comparator 264 compares the value $(X_S-R_A)$ with the reference value outputted from the reference value generator 265. The reference value is previously set to be less than the vertical scanning width corresponding to the storage capacity of the subdivided classification memory 269 which can be obtained by multiplying $N_x$ in FIG. 24B by "8". The first intermediate signals are stored in the carryover classification memory 268 when the result of subtraction $(X_s-R_A)$ is larger than the reference value set in the reference value generator 265, and in the subdivided classification memory 269 when the result of the subtraction is smaller than the reference value.

Figure 31:
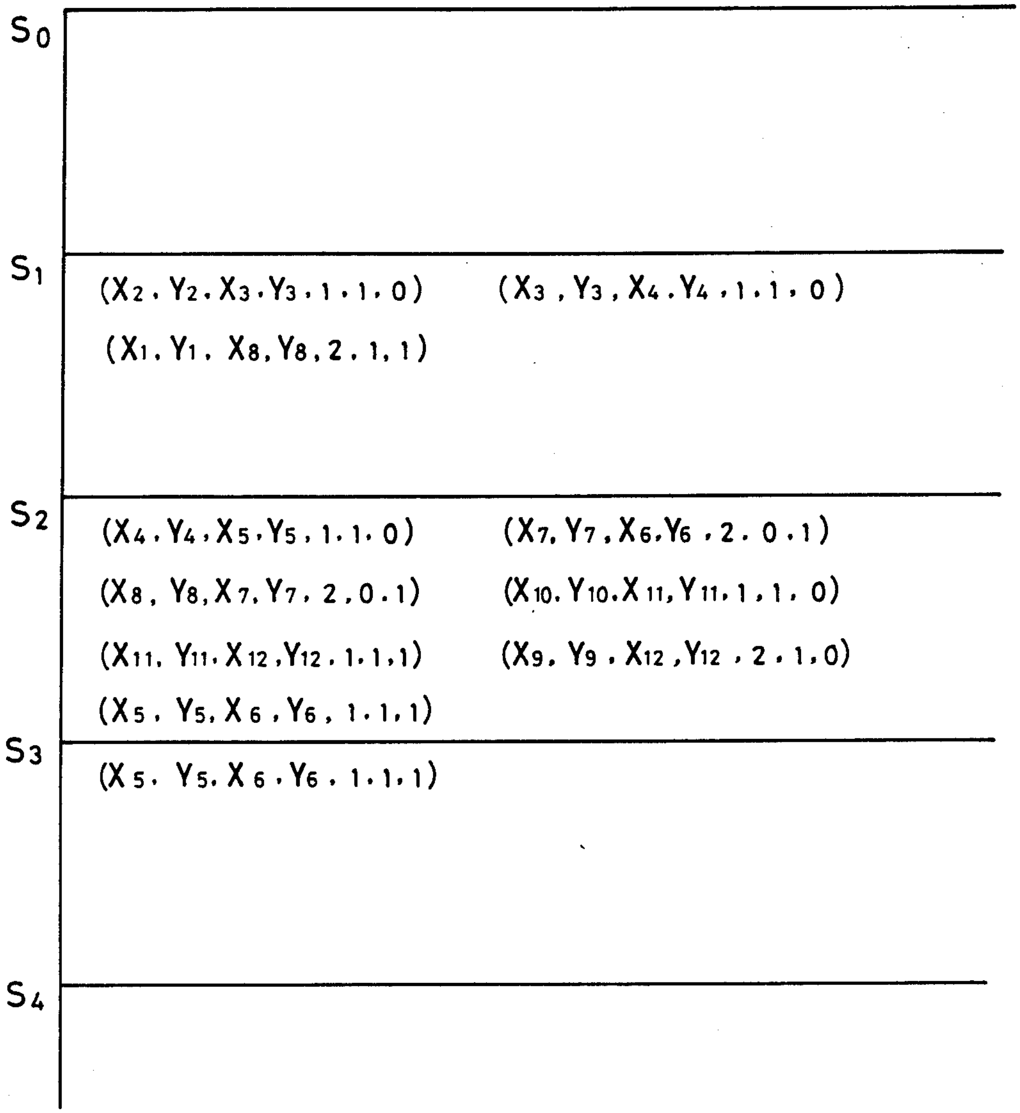
FIG. 31 is a diagram showing examples of data contained in subdivided classification memories.

FIG. 31 typically shows the manner in which the segment data for the figure as shown in FIG. 25 are stored in the subdivided classification memory 269 ($S_0-S_7$). With respect to a figure $T_a$ as shown in FIG. 24B, the first intermediate signals expressing the segments $\overline{Q_1Q_2}$, $\overline{Q_2Q_3}$ and $\overline{Q_1Q_4}$ are stored in the subdivided classification memory $S_5$ and the first intermediate signals expressing the segment $\overline{Q_3Q_4}$ are stored in the carryover classification memory $K_3$.

However, the carryover classification memories $K_0'$ to $K_3'$ shown in FIG. 24B are not present at this time, and hence the carryover classification memory $K_3$, which is the last one in order of the carryover classification memories present at this time, is selected to store the data for the segments (e.g., segment $\overline{Q_3Q_4}$ for the figure $T_a$) having the record starting point $Q_3$ in this region.

When all of the first intermediate signals to be stored in the unit subdivided classification memories $S_0$ to $S_7$ are stored, the entire first intermediate signals stored in the subdivided classification memory $S_0$ are read out one by one and, after that, the first intermediate signals stored in the subsequent memories $S_1$ to $S_7$ are read out along the order thereof in the same manner (FIGS. 30(B) to (E)).

The ROM (or RAM) 267 is adapted to determine from which storage region of the carryover and subdivided classification memories 268 and 269 the first intermediate signals are to be read out in response to the value of the vertical scanning address $R_A$.

The reading outputs from the subdivided classification memory 269 are sequentially supplied to the main scanning coordinate calculating circuit 206 as the permuted first intermediate signals. When all of the first intermediate signals in the four subdivided classification memories $S_0$ to $S_3$ are read with progress of the recording (FIGS. 30(E) to (F)), the first intermediate signals stored in the subsequent carryover classification memory $K_0$ in the sequence of recording are read from the same to be classified along the sequence of recording and stored in any of the four vacated subdivided classification memories $S_0$ to $S_3$ (FIG. 30(F)). The recording is started from FIG. 30(E). Thus, the storage contents of the carryover classification memory are sequentially re-distributed to the subdivided classification memories $S_0$ to $S_7$ in response to the start point coordinate $X_s$, with progress of the recording.

Figure 30:
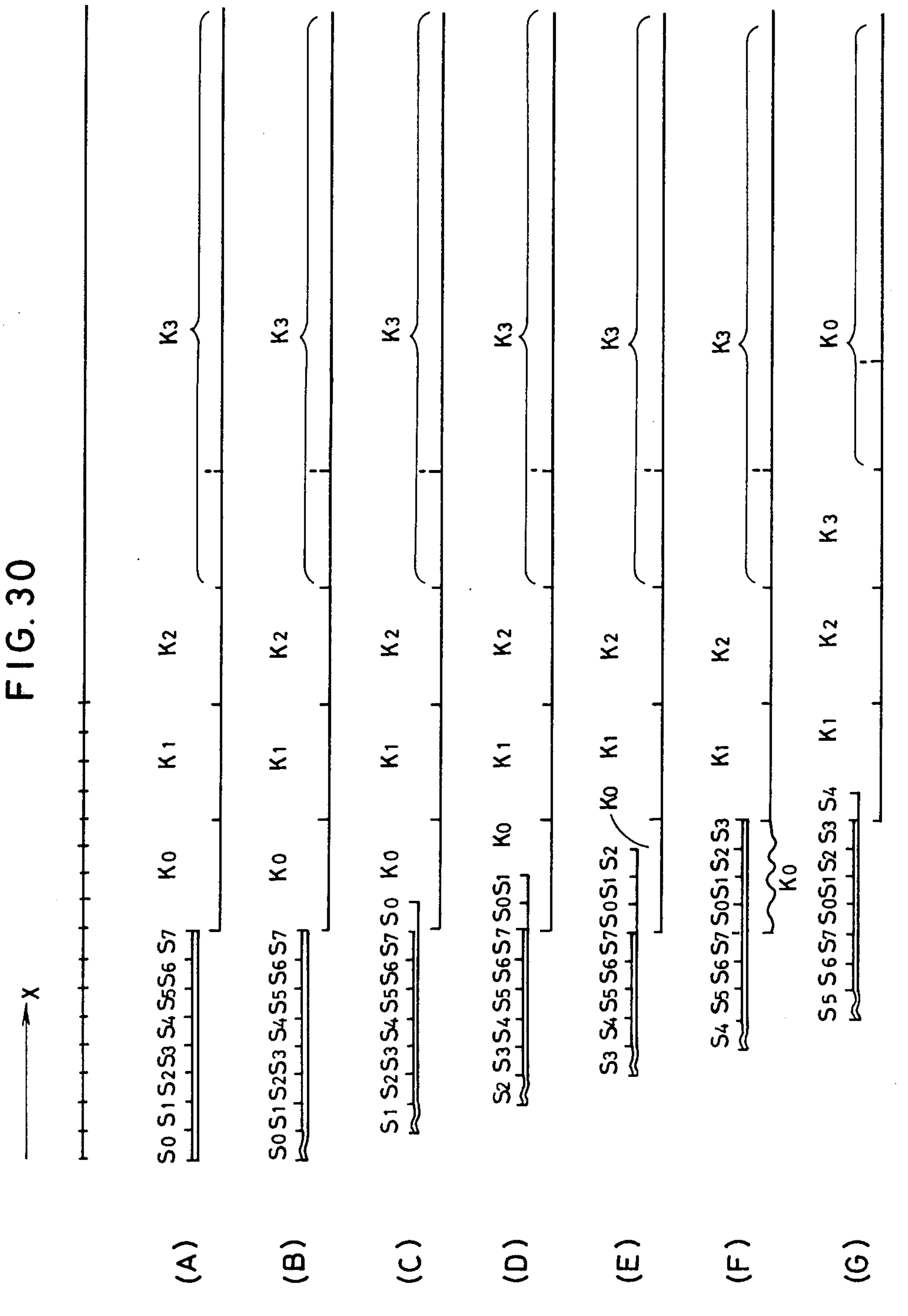
FIG. 30 is a diagram showing relation between progress of recording/scanning and storing ranges of classification memories.

As hereinabove described, the signal $X_s$ in the first intermediate signals determines the X coordinate (vertical scanning coordinate) in FIG. 30. When the vertical scanning address $R_A$ is "0" at this time, there is no duplication between the storage ranges of the carryover and subdivided classification memories 268 and 269 as shown at FIG. 30(A), and hence the classification memory for storage of the first intermediate signal is uniquely determined.

On the other hand, when the vertical scanning address $R_A$ is increased to correspond to the states as shown in FIGS. 30(B) to (E), a problem is coming up whether the first intermediate signals having X coordinates corresponding to the storage ranges of the carryover classification memories $K_0$ to $K_3$ are to be stored in the carryover classification memories $K_0$, $K_1$, $K_2$ and $K_3$ or in any of the subdivided classification memories $S_0$ to $S_7$. In order to solve the problem, such selection of the classification memory is determined by comparison of the value of the vertical scanning address $R_A$ at that time and the reference value from the reference value generator 265.

In other words, when the value $X_s$ of the first intermediate signals is sufficiently larger than the address $R_A$, the output from the comparator 264 enters the ROM (or RAM) 266 as a signal for selecting the carryover classification memory. On the other hand, when the value $X_s$ is unsufficiently larger than the address $R_A$, the subdivided classification memory is selected. Then, in response to the result of the selection, the ROM 266 determines a storage region of the carryover classification memory 268 or the subdivided classification memory 269 in which the first intermediate signals are to be written.

However, the first intermediate signals for the segments such as the segment $\overline{Q_3Q_4}$ of the figure $T_a$ as shown in FIG. 24B, which are temporarily stored in the last carryover classification memory (e.g., $K_3$) present at the time when the same is input for the first time since corresponding storage region of the carryover classification memory is not yet present, are processed as follows:

When the vertical scanning is advanced thereby to restore the first intermediate signals in the carryover classification memory $K_3$ in, e.g., the subdivided classification memories $S_4$ to $S_7$, the segments such as $\overline{Q_3Q_4}$ in the read first intermediate signals, whose record starting point coordinates $X_s$ are not contained in the ranges of the subdivided classification memories $S_4$ to $S_7$ at that time, are re-stored in any of subsequent carryover classification memories $K_0'$ to $K_3'$ as shown in FIG. 24B in response to the value $X_s$ of the first intermediate signals of the said segments.

At this time, further, coordinate data for polygons (e.g., a figure $T_b$ in FIG. 24B) whose segments are present in the carryover classification memory (e.g. $K_0'$) for the first time are transmitted from the host system 201 through the coordinate transformation circuit 202. Then, the coordinate data transformed into first intermediate signals per segment by the segment decomposition circuit 203 to be sorted in the carryover classification memories ($K_0'$) to ($K_3'$).

Thus, the segment classification circuit 204 performs the following three operations (A) to (C) in parallel:

(A) The first intermediate signals permuted in the units of the subdivided classification memories are transmitted to the main scanning coordinate calculating circuit 206.

(B) The first intermediate signals stored in the carryover classification memory are read out to be re-stored in the subdivided classification memories or subsequent carryover classification memories in the units of the storage capacity of a carryover classification memory.

(C) With progress of the recording, the first intermediate signals for the segments with respect to the polygons remaining in the host system 201 are transmitted and stored in the subdivided or carryover classification memories.

Thus, the main function of the segment classification circuit 204 is to permute the first intermediate signals in the units of the subdivided classification memories and output first intermediate signals.

The ROMs 266 and 267 may be replaced by RAMs in order to arbitrarily change the storage capacity of the subdivided and carryover classification memories $S_0$ to $S_7$ and $K_0$ to $K_3$.

(E-3) Details of Main Scanning Coordinate Calculating Circuit 206.

Figure 32:
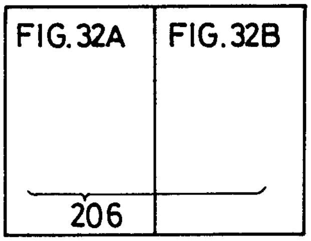
FIG. 32 is a diagram showing a positional relation in arrangement of FIGS. 32A and 32B.
Figure 32A:
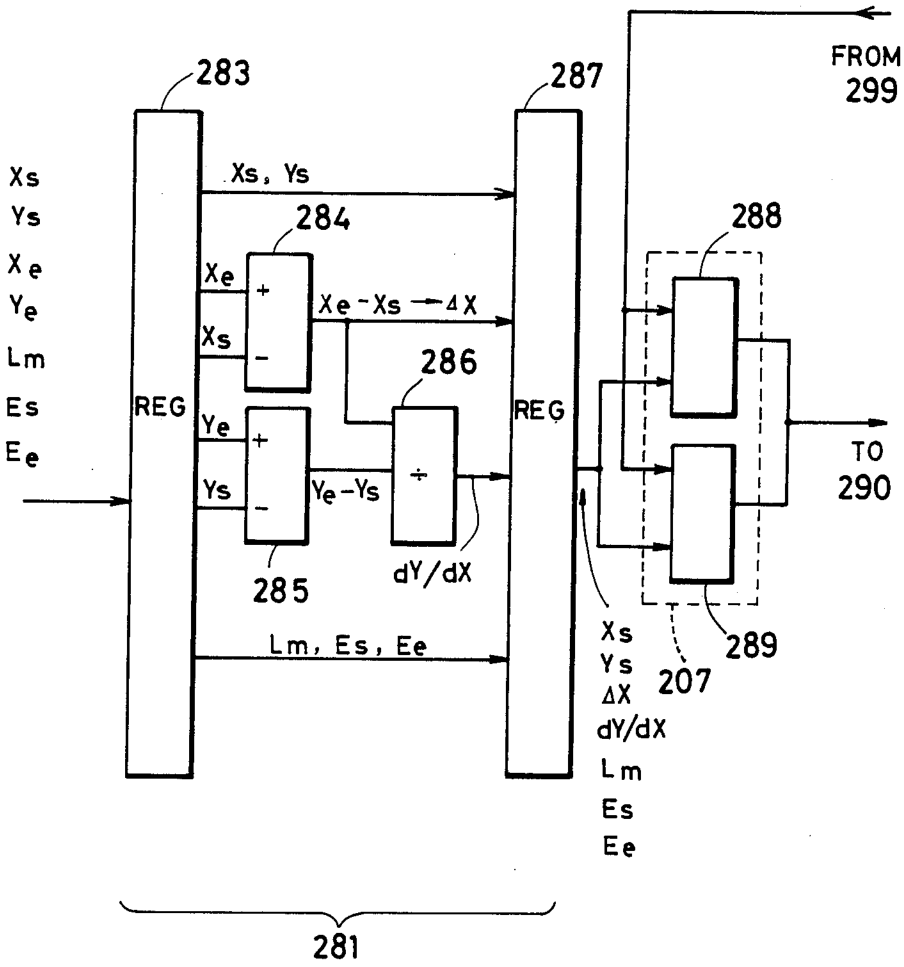
FIGS. 32A and 32B are diagrams to be arranged together thereby to show a example of structure of a main scanning coordinate calculating circuit.
Figure 32B:
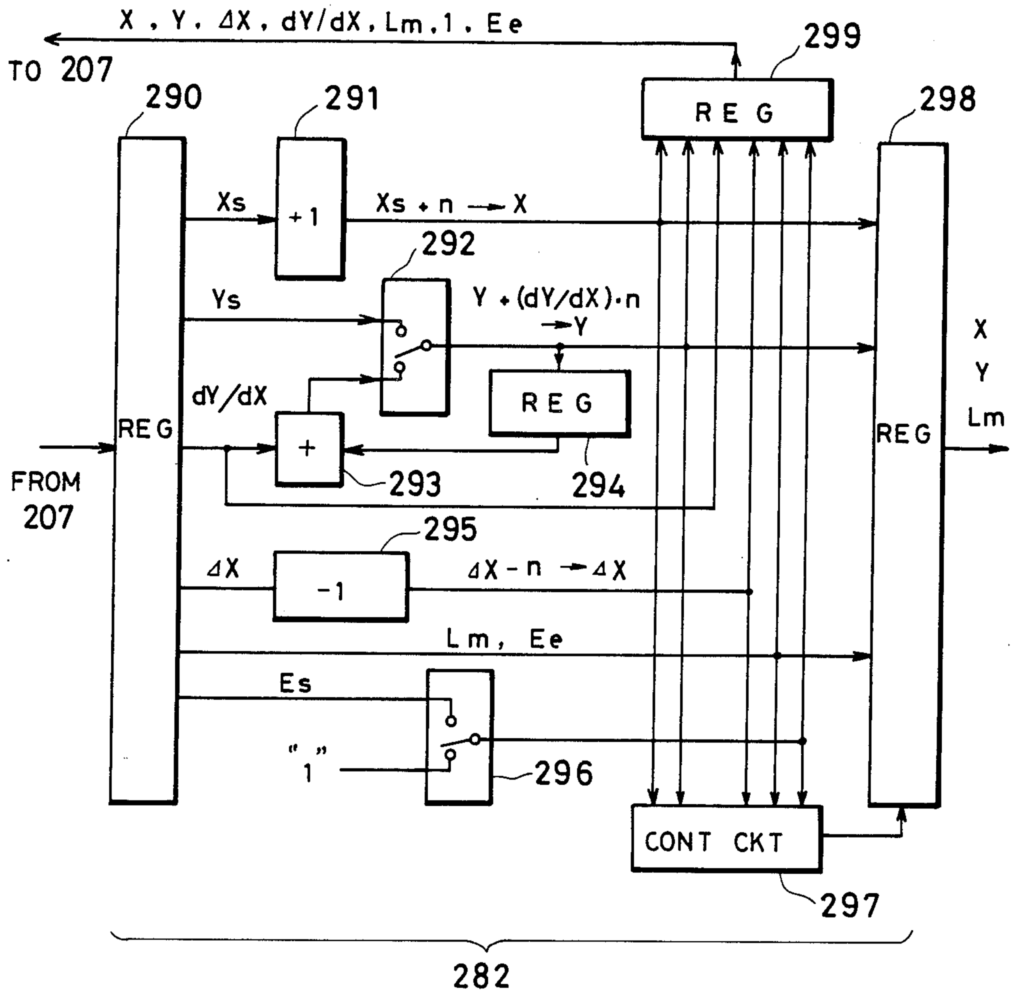

FIGS. 32A and 32B are diagrams to be arranged together thereby to show the main scanning coordinate calculating circuit 206 in detail, and FIG. 32 shows the positional relation in the arrangement of FIGS. 32A and 32B. Referring to FIGS. 32A and 32B, the main scanning coordinate calculating circuit 206 is formed by a data converting circuit 281, a memory 207 and a coordinate calculating circuit 282. The data converting circuit 281 as shown in FIG. 32A is formed by registers 283 and 287, subtractors 284 and 285 and a divider 286. The subtractors 284 and 285 perform subtractions $\Delta X=(X_e-X_s)$ and $(Y_e-Y_s)$ respectively while the divider 286 performs a division $dY/dX=(Y_3-Y_s)/(X_e-X_s)$.

The first intermediate signals are thus converted into the second intermediate signals as output of the register 287, which are formed by the following data:

record start point coordinates: $X_s$, $Y_s$
number of vertical scanning lines of segment: X
coefficient of inclination: dY/dX
segment mode: $L_m$
record start point flag: $E_s$
record end point flag: $E_e$ The registers 283 and 287 are adapted to adjust the data transfer timing.

The second intermediate signals thus obtained are transmitted to the memory 207. The memory 207 is formed by two unit memories 288 and 289, which alternately perform writing and reading synchronously with reading from the subdivided classification memory 269 as shown in FIG. 29.

In the unit memory (e.g., 288) under writing, not only are the second intermediate signals transmitted from the data converting circuit 281 being written, but also the second intermediate signals already provided to the coordinate calculating circuit 282 as shown in FIG. 32B and returned therefrom, as hereinafter described.

On the other hand, outputs of the unit memory (e.g., 289) under reading are the second intermediate signals obtained by converting the outputs from the subdivided classification memory 269 as shown in FIG. 29 and the second intermediate signals returned from the coordinate calculating circuit 282. These outputs are transmitted to the coordinate calculating circuit 282.

The coordinate calculating circuit 282 as shown in FIG. 32B is formed by a register 290, a presettable up-counter 291, a selector 292, an adder 293, a register 294, a presettable down-counter 295, a selector 296, a control circuit 297 and registers 298 and 299. The second intermediate signals received in the coordinate calculating circuit 282 are latched by the register 290 to be changed as follows:

When the second intermediate signals are received in the coordinate calculating circuit 282 through the register 290, the record start point coordinate $X_s$ is preset to the presettable counter 291 to be outputted to the registers 298 and 299. Record start point coordinate $Y_s$ are passed through the selector 292 to be inputted in the registers 294, 298 and 299 while the segment mode $L_m$ are inputted in the registers 298 and 299. The record starting point flag $E_s$ is inputted in the control circuit 297 through the selector 296, to serve as gate signals for the register 298.

The third intermediate signals generated in the coordinate calculating circuit 282 are formed by the following data:
coordinate signals: X, Y
segment mode: $L_m$
flag: F
The coordinate signals X, Y are adapted to indicate the coordinates of each point on a segement and the flag F is any of $E_s$, "1" and $E_e$.

The third intermediate signals first generated in the coordinate calculating circuit 282 are X ($=X_s$), Y ($=Y_s$), $L_m$ and $E_s$, and when $E_s$ is "1", the control circuit 297 supplies pulse to the register 298, whereby the register 298 outputs fourth intermediate signals X, Y and $L_m$.

The fourth intermediate signals are formed by the following data:
coordinate signals: X, Y
segment mode: $L_m$ When a third intermediate signal is generated to be inputted in the control circuit 297, a subsequent third intermediate signal is generated in the timing sequence (1) to (5) as follows.

(1) The counter 291 counts up by (+1) so that the coordinate signal X is changed to ($X_s+1$).

(2) A pulse is inputted in the register 294 to maintain the value Y, and the value Y is added up with the value dY/dX in the adder 293.

(3) The selector 292 is so switched that the coordinate signal Y is changed to (Y+dY/dX).

(4) The counter 295 counts down by "1" so that the number of vertical scanning lines of segment ΔX, is changed to (ΔX−1), and (5) The flag F is switched in the selector 296 to be new flag "1".

In FIG. 32B, respective signals are shown as the repeating operations are already performed by n-times.

After the aforementioned updating (1) to (5) is once completed, the third intermediate signals have new value X, Y, ΔX, dy/dx, $L_m$, "1" and $E_e$, which also function as a new second intermediate signals as described later. During the time when ΔX is equal to or more than "1", the signals X, Y and $L_m$ are transmitted from the register 298 to the raster data output processing circuit 208 as shown in FIG. 23 as the fourth intermediate signals, and thereafter the aforementioned operation is repeated until ΔX becomes "0".

When ΔX becomes "0", the third intermediate signals become X, Y, $L_m$ and $E_e$. When $E_e$ is "1", the fourth intermediate signals X, Y and $L_m$ are transmitted from the register 298 to the raster data output processing circuit 208 as shown in FIG. 23, to terminate the processing with respect to the segment.

When the control circuit 297 makes a determination that X becomes a value indicating a vertical scanning line belonging to the storage area of a subsequent subdivided classification memory before X becomes "0", the second intermediate signal is returned through the register 299 to the unit memory (e.g., 288) in the memory 207, to be written therein. Namely, the second intermediate signals function as the new second intermediate signals according to the circumstances. Such operation is repeated a plurality of times with respect to, e.g., the segments $\overline{Q_2Q_3}$ and $\overline{Q_1Q_4}$ for the figure $T_a$ as shown in FIG. 24B.

As hereinabove described, such operations in which X becomes (X+1), Y becomes (Y+dY/dX) and ΔX becomes (ΔX−1) are repeated with respect to one second intermediate signal thereby to generate the third intermediate signal and a new second intermediate signal until the unit memory (e.g., 289) under reading is vacated.

When the second intermediate signals to be read are entirely read and the second intermediate signals to be written are entirely written with respect to the unit memories 289 and 288 respectively, the reading and writing operations of the unit memories 289 and 288 alternate with each other.

In addition to the raster start and end mode, the other mode can be considered as the mode of a segment. It is a raster start and end point mode in which recording (filling) is terminated immediately after the recording is started. This is the mode called as the "specific mode" in the first embodiment. However, the mode data $L_m$ included in the fourth intermediate signals in the second embodiment itself has no "raster start and end point mode" as defined in the first embodiment. This is because the respective segments forming the polygons are treated as independent segments in this stage. The specific mode is provided in the subsequent raster data output processing circuit 208 in the second embodiment. Such provision of the specific mode is performed not only by the mutual relation between the segments forming one polygon but by overlapping conditions of a plurality of polygons similarly to the first embodiment.

(E-4) Raster Data Output Processing Circuit 208

The raster data output processing circuit 208 functions similarly to the circuits from the write data producing circuit 3 to the output signal generator 11 in the first embodiment as shown in FIG. 6, and hence the raster data output processing circuit 208 is briefly described within a range required for understanding of the second embodiment.

Figure 33:
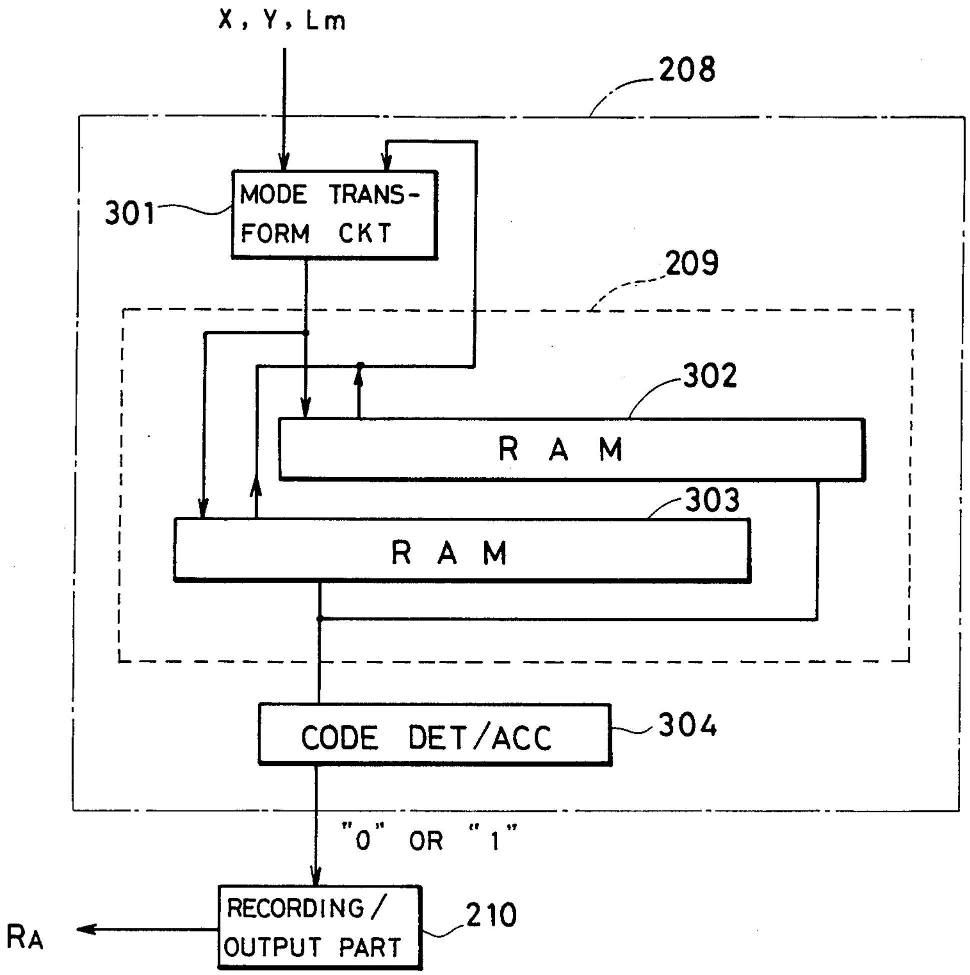
FIG. 33 is a diagram showing an example of structure of a raster data output processing circuit as shown in FIG. 23.

FIG. 33 is a schematic diagram showing the details of the raster data output processing circuit 208. The raster data output processing circuit 208 is formed by a mode transformation circuit 301, memory 209 and a code detector/accumulator 304. A recording/output part 210 receiving the outputs from the raster data output processing circuit 208 outputs the vertical scanning addresses $R_A$ under recording as well as raster output.

The memory 209 is formed by two RAMs 302 and 303, which in turn alternately perform writing and reading. When reading is completed, the RAM under reading is cleared once. Each of the RAMs 302 and 303 have storage capacity corresponding to the number of vertical scanning lines contained in the storage range of one division of the subdivided classification memory. In other words, when the main scanning direction is also taken into consideration, the storage capacity of the RAMs 302 and 303 are correspoinding to the number of the recording dots which can be stored in the one division of the subdivided sorting memory, These RAMs 302 and 303 store three-bit mode data M obtained by accumulating mode data $L_m$ for the segments inputted to that time in a similar form to the first embodiment, in correspondence to the coordinates (X, Y) on the recording plane. A code transformation rule required for such accumulation of the mode data M is provided by FIGS. 16A and 16B as hereinabove described.

Therefore, the RAMs 302 and 303 correspond to the RAMs 4a and 4b in FIG. 6 respectively, while the mode transformation circuit 301 corresponds to the write data producing circuit 3 and the like in FIG. 6. Further, the code detector/accumulator 304 corresponds to the code detector 6, the accumulator 7, the output signal producing circuit 11 and the like in FIG. 6.

A code "100" indicating the specific mode is not previously provided in the fourth intermediate signals $L_m$, but the specific point code "100" is provided when a value obtained as the result of accumulation of the mode data $L_m$ with respect to a plurality of segments becomes "0". Further, since the respective segments are independently processed, the specific mode is provided not only by overlapping of a plurality of polygons but by overlapping of terminal points of segments belonging to the same polygon.

When the fourth intermediate signals X, Y and $L_m$ are inputted in the mode transformation circuit 301 on such premise, storage contents M in address (X, Y) of the RAM (e.g., 302) are read out whereby the mode transformation circuit 301 performs a transformation of M by the mode $L_m$ in accordance with the rule as shown by FIGS. 16A and 16B. The RAMs 302 and 303 are provided with "000" as initial values, also similarly to the first embodiment.

The new accumlated mode data M thus obtained by the transformation in the mode transformation circuit 301 is restored in the address (X, Y) in which the accumulated mode M under transformation was stored.

On the other hand, in parallel to the operation of the mode transformation and the accumration to the RAM (e.g., 302), the accumulated modes M already completely accumulated and stored in the other RAM (e.g., 303) are read from the same sequentially along the scanning lines to be code-detected or code-accumulated by the code detector/accumulator 304. The term "code detection" indicates detection of the inputted codes when the same are the specific code "100" similarly to the first embodiment, so that a "1" signal is outputted for one dot when the code is "100". Further, the term "code accumulation" in this step indicates addition of inputted codes other than the specific codes sequentially along the main scanning direction.

The "1" signals are continuously transmitted to the recording/output part 210 during the time when the sign of the result of the accumulation is (+1) and the "0" signals in other case. The recording/output part 210 records the images in such operation to emit exposure beams when "1" is inputted while emitting no such exposure beam in the case of "0" input.

Description is now made on an example of such image recording. For the point $P_1$ in FIG. 28, "mode 1" transformation from "000" to "001" (see FIG. 16A or FIG. 16B) is performed as a point on the segment $\overline{P_1P_2}$ and "mode 2" transformation from "001" to "100" is performed as a point on the segment $\overline{P_1P_8}$. Since it is detected that this mode is the specific mode by detection of the code "100" by the code detector/accumulator 304, the detector/accumulator 304 outputs "1" by one dot at the point $P_1$ and hence only the point $P_1$ is recorded on the recording plane. The other points on the main scanning line to which the point $P_1$ belongs are not recorded because the output of the detector/accumulator is "0" for these points.

With respect to a middle point of the segment $\overline{P_1P_2}$ intersecting with the scanning lines, "mode 1" transformation from "000" to "001" is performed whereby the code detector/accumulator 304 accumulates as "001" to continuously output the "1" signals for the points following in the rear of the middle points. In points where the scanning lines intersect with the segment $\overline{P_1P_8}$, the "mode 2" transformation from "000" to "111" is performed. In the recording process, the "111" is read out from the memory and accumlated with "001" ("001"+"111"="1000") to be "000", whereby "0" signals are outputted from the subsequent dot. Filling of the inner region of the figure in accordance with the second embodiment is performed in such a manner.

when two or more polygons are overlapped, the mode transformation circuit 301 performs, e.g., the "mode 1" transformation from "000" to "001" and then performs the "mode 1" transformation again, whereby "001" is further changed to "010". When the mode data M thus obtained is read out and inputted to the code detector/accumulator 304, the "1" signals are continuously outputted until the mode data M subjected to the "mode 2" code transformation is twice inputted.

The mode data M stored in the RAMs 302 and 303 may be converted to run-length data.

(F) Storage Capacity of Each Memory

In the aforementioned embodiment, the storage capacity in the number of vertical scanning lines of the subdivision of the subdivided classification memory 269 in the segment classification circuit 204, that of the respective memories 288 and 289 in the main scanning coordinate calculating circuit 206 and that of the RAMs 302 and 303 in the raster data output processing circuit 208 are identical with each other. The storage capacity of the RAMs 302 and 303 per main scanning line is matched with the number of dots required for practical recording of one scanning line.

(G) Processing of Specific Segments

<Segment $\overline{P_iP_{i+1}}$ along the Main Scanning Direction>

This case corresponds to the condition that $\Delta X$ is "0" and $\Delta Y$ is (+) or (−). Since $\Delta X$ and $\Delta Y$ of $\overline{P_iP_{i+1}}$ are (0+) or (0−) in this case, $G(\overline{P_iP_{i+1}})$ is "1" or "3" from FIG. 27. Referrinig to Table 1, there are 32 combinations in which $G(\overline{P_iP_{i+1}})$ is "1" or "3". With respect to 24 combinations within these combinations, $G(\overline{P_{i+1}P_{i+2}})$ with respect to a segment $\overline{P_{i+1}P_{i+2}}$ followingly adjacent to the segment $\overline{P_iP_{i+1}}$ is not 3 nor 1, and the segment mode $L_m$ is "0". When the segment mode $L_m$ is "0", the segment decomposition circuit 203 outputs no first intermediate signal. This is because the raster output for the intermediate segment $\overline{P_iP_{i+1}}$ is obtained only by the first intermediate signals from the terminal points of horizontally adjacent segments $\overline{P_{i-1}P_i}$ and $\overline{P_{i+1}P_{i+2}}$. By employing this rule, the recording process is hastened.

In the remaining 8 combinations in which the segment mode $L_m$ is "1" or "3", the segment mode $L_m$ for at least one of the horizontally adjacent segments is "1" or "3". This is because this case corresponds to the condition that the horizontal segment of the polygon is bent halfway, and the raster output with respect to the middle segment cannot be obtained unless the first intermediate signals are supplied to the middle segment.

<Segment formed with Only One Point>

In a figure formed with only one point $P_0$ ($X_0$, $Y_0$), the following two first intermediate signals are transmitted to the segment sorting part 204:

$X_0$, $Y_0$, $X_0$, $Y_0$, 1, 1, 1, $X_0$, $Y_0$, $X_0$, $Y_0$, 2, 1, 1,

The first intermediate signals may be transmitted from the host system 201 directly to the segment classification circuit 204.

<Figure formed by Segments Connecting Two Points>

Assuming that the coordinates of two points are expressed as ($X_1$, $Y_1$) and ($X_2$, $Y_2$), the following first intermediate signals are provided:

| | |
|---|---|
| (1) In case of | $X_1 = X_2$, $Y_1 < Y_2$ |
| | $X_1, Y_1, X_1, Y_1, 1, 1, 1$ |
| | $X_2, Y_2, X_2, Y_2, 2, 1, 1$ |
| (2) In case of | $X_1 = X_2$, $Y_1 > Y_2$ |
| | $X_2, Y_2, X_2, Y_2, 1, 1, 1$ |
| | $X_1, Y_1, X_1, Y_1, 2, 1, 1$ |
| (3) In case of | $X_1 < X_2$ |
| | $X_1, Y_1, X_2, Y_2, 1, 1, 1$ |
| | $X_1, Y_1, X_2, Y_2, 2, 1, 1$ |
| (4) In case of | $X_1 > X_2$ |
| | $X_2, Y_2, X_1, Y_1, 1, 1, 1$ |
| | $X_2, Y_2, X_1, Y_1, 2, 1, 1$ |

The two first intermediate signals may be transmitted from the host system 201 directly to the segment classification circuit 204.

When $X_1 = X_2$ and $Y_1 = Y_2$, the figure is formed by one point and aforementioned processing with respect to the figure with only one point is performed.

(H) First Modification

Although the first intermediate signals are permuted in the second embodiment, the first intermediate signals may be directly converted into the second intermediate signals and permutation is performed with respect to the second intermediate signals. Selection of the order of the conversion and the permutation depends on which are more readily processed in view of storage capacity, the data $X_e$ and $Y_e$ of the first intermediate signals or the data $\Delta X$ and $(dY/dX)$ of the second intermediate signals.

(I) Second Modification

When the memory 205 in the segment classification circuit 204 is sufficient in storage capacity, the carry-over classification memory 268 may be so segmented as to change $K_0'$, $K_1'$, $K_2'$ and $K_3'$ as shown in FIG. 24B to $K_4$, $K_5$, $K_6$ and $K_7$ thereby to simplify processing in the segment classification circuit 204. When the storage capacity is further sufficient, the memory 205 may be entirely constructed only with the subdivided classification memories.

(J) Supplement

The numbers of write data and read data of the memory 205 and 207 are always verified, thereby to detect memory vacancy. Further, in data transfer between respective blocks shown in FIG. 23, general handshaking operation is performed.

(K) Advantages of Second Embodiment

As hereinabove described, the second embodiment has the following advantages:

(1) Recording is so performed as to fill inputted figure in fidelity.

(2) Each segment obtained by connecting two vertices contained in a polygon is treated as an independent first intermediate signal, whereby processing speed is improved without necessity of considering the relation between the segment and the original polygon.

(3) In the case of a segment in the main scanning direction, data processing becomes unnecessary with respect to most of the points forming the segment, whereby the processing speed is improved.

(4) Data transfer is performed every time the memory is vacated, whereby the control circuit is not complicated.

(5) Since the polygons are decomposed into data for segments and buffer memory is provided in the middle of the processing steps thereby to adjust data transfer, and hence the data are transmitted to the recording-/output part without interruption, the efficiency is improved.

(6) The segment classification circuit 204 may be in such capacity as corresponding to absolute quantities of data of characters, figure and the like, whereby the processing speed can be increased.

(7) Fixed polygon data such as characters may be stored in the host system 201 until recording is started, whereby the segment classification circuit 204, the main scanning coordinate calculating circuit 206 and the raster data output processing circuit 208 can be minimized in storage capacity.

(8) When stored in the host system 201, the fixed polygon data such as characters may be only data such as character codes, ouptut positions of the center of characters, inclinations and magnifications, which may be an extremely small quality of data in comparison with the numbers of data required in the segment classification circuit 204, whereby the storage capacity can be minimized.

(9) The raster data output processing circuit can perform such processing of filling or not filling a desired region of two or more overlapped polygons in response to the number of overlapping by appropriately changing the types of codes for making the recording/output part output "1". This corresponds to the processing as hereinabove described with reference to the first embodiment.

Thus, the second embodiment is so advantageous that the processing is systematically performed and the processing speed is increased since the processing is performed in a hardware manner.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A method of processing image data to obtain raster output for filling inner regions of one or more polygons along a sequence of scanning lines thereby to record images, said method comprising the steps of:

inputting coordinate data of terminal points of segments forming respective sides of said polygons;

providing, on the basis of said coordinate data, mode data for each of said segments to identify for points on said segment at intersections with said scanning lines a mode datum having one of a plurality of values, a first value defining a raster start mode, a second value defining a raster end mode, and a third value defining a raster start and end mode;

along each scanning line, summing values of said mode data provided for points on polygon segments intersecting said scanning line and, for each said point at an intersection of said scanning line with one of said segments, storing said summed value of said mode data in a memory means; and reading said stored mode data stored in said memory means along scanning lines, thereby to obtain raster outputs for filling said inner regions of said polygons at each point on said scanning lines in accordance with said summed values of said mode data.

2. A method of processing image data to obtain raster output for filling inner regions of one or more polygons along a sequence of scanning lines thereby to record images, said method comprising the steps of:

inputting coordinate data of terminal points of segments forming respective sides of said polygons;

providing, on the basis of said coordinate data, mode data for each of said segments to identify for points on said segment at intersections with said scanning lines a mode datum having one of a plurality of values, a first value defining a raster start mode, a second value defining a raster end mode, and a third value defining a raster start and end mode;

along each scanning line, accumulating values of said mode data provided for points on polygon segments intersecting said scanning line and, for each said point at an intersection of said scanning line with one of said segments, storing said accumulated value of said mode data in a memory means; and reading said stored mode data stored in said memory means along scanning lines, thereby to obtain raster outputs for filling said inner regions of said polygons at each point on said scanning lines in accordance with said accumulated values of said mode data, wherein said mode data has a data length of n-bits per pixel, n being an integer, said memory means are RAMs having capacity for storing mode data for one or more scanning lines, including the step of clearing said RAMs every time said stored mode data is entirely read to provide said raster outputs for a scanned line, said accumulating and storing steps for said mode data for each said record coordinate comprising the further steps of reading a previously stored value of said mode data from said memory means, transforming said read mode data by accumulating with the newly provided mode data and re-storing said accumulated mode data thus obtained in said memory means, repeating said steps from said input to said output sequentially in compliance with a storage capacity of said memory means.

3. A method of processing image data in accordance with claim 2, comprising the further steps of encoding values of said mode datum by assigning to two different types of said mode datum two groups of code data which are in 2's complement relation with each other, said step of accumulating said mode data for each said record coordinate comprising transformation and accumulation of said 2's complement encoded data, said transforming step thereby comprising the step of adding values of mode data of one type encountered during a scan and subtracting therefrom values of mode data of a different type encountered during the scan to provide said raster outputs for filling said inner regions of said polygons at each point on said scanning lines.

4. A method of processing image data in accordance with claim 3, wherein said code data are compared with prescribed reference values when said code data are read as said mode data from said memory means along said scanning lines to be sequentially accumulated, whereby said raster outputs are obtained in compliance with the results of said comparison.

5. A method of processing image data to obtain raster output for filling inner regions of one or more polygons along a sequence of scanning lines thereby to record images, said method comprising the steps of:

inputting coordinate data of terminal points of segments forming respective sides of said polygons;

providing first intermediate signals representing a recording characteristic of a plurality of line segments forming respective sides of said polygons on the basis of relationships between the coordinate data of four sequential vertices in said polygon including both terminal points of said segment as two intermediate vertices thereof, said first intermediate signals including coordinates of both terminal points of said segment, mode data for said segment and first flags with respect to record start and end points of said segment, said mode data being provided to indicate whether points on said segment are in a raster start mode or a raster end mode with respect to said scanning lines, converting said first intermediate signals to obtain second intermediate signals including coordinates of record start points of said segments, the number of vertical scanning lines of each segment, a coefficient of inclination, said mode data and said first flags for every segment, permuting said first or second intermediate signals along said sequence of said scanning lines, providing trains of intersection points of said segments and said scanning lines from said second intermediate signals thereby to obtain third intermediate signals including positional coordinates, said mode data and second flags for respective ones of said intersection points, said second flags being adapted to indicate whether said third intermediate signals are to be further converted to give said raster output with respect to said intersection points, converting said third intermediate signals in response to said second flags thereby to obtain fourth intermediate signals including said positional coordinates and said mode data with respect to said trains of intersection points, accumulating said mode data included in said fourth intermediate signals for each said record coordinate of said segment to store said mode data in memory means, and reading said mode data stored in said memory means along scanning lines to sequentially accumulate said mode data, thereby to obtain said raster output for filling said inner regions of said polygons in response to results of said accumulation in respective positions on said scanning lines.

6. A method of processing image data in accordance with claim 5, wherein said mode data has a data length of n-bits per pixel, n being an integer, said memory means are RAMs having a storage capacity for one or more scanning lines, said RAMs being cleared every time said stored mode data is entirely read to provide said raster outputs, said accumulating and storing steps for said mode data for each said record coordinate comprising the further steps of reading said mode data already written in said memory means to transform said read mode data by newly provided mode data thereby to accumulate said mode data and re-store in said memory means said mode data thus obtained by said transformation, repeating said steps respectively from said input to said output sequentially in compliance with storage capacity of said memory means.

7. A method of processing image data in accordance with claim 5, wherein two groups of code data which are in 2's complement relation with each other are respectively assigned as said mode data with respect to overlapping numbers of said raster start modes and said raster end modes, and said accumulation of said mode data for each said record coordinate comprises transformation and accumulation of said code data.

8. A method of processing image data in accordance with claim 7, wherein said code data are compared with prescribed reference values when said code data are read as said mode data from said memory means along said scanning lines to be sequentially accumulated, whereby said raster outputs are obtained in compliance with the results of said comparison.

9. A method of processing image data in accordance with claim 5, wherein said mode data stored in said memory means includes, in addition to modes respectively indicating whether points on said segment are in said raster start mode or said raster end mode, specific point mode indicating such case where a point on said segment is said raster start and end point, said specific mode being generated in said step of accumulating said mode data included in said fourth intermediate signals per said record coordinate.

10. A method of processing image data in accordance with claim 5, wherein said permutation of said first or second intermediate signals is performed by classifying and storing said signals in a plurality of storage regions of classification memory means assigned per record area in the vertical scanning direction in compliance with coordinates of said record start points of said segments and by reading out said signals from said storage regions of said classification memory means along said sequence of scanning.

11. A method of processing image data in accordance with claim 10, wherein said classification memory means include a first classification memory means for storing data for segments in the vicinity of image regions currently being recorded and a second classification memory means for storing data for segments in regions to be subsequently recorded, said image regions to be respectively stored in said first and second classification memory means being sequentially changed with progress of said recording.

12. An apparatus for processing image data to obtain raster output for recording images by filling inner regions of one or more polygons along a sequence of scanning lines, said apparatus comprising:

input means for inputting coordinate data of terminal points of segments forming respective sides of said polygons;

mode data means for providing, on the basis of said coordinate data, mode data for each of said segments to identify for points on said segment at intersections with said scanning lines a mode datum having one of a plurality of values, a first value defining a raster start mode, a second value defining a raster end mode, and a third value defining a raster start and end mode;

accumulation/storage means operable along each scanning line for accumulating values of said mode data provided for points on polygon segments intersecting said scanning line and, for each said point at an intersection of said scanning line with one of said segments, storing said accumulated value of said mode data; and output data producing means for reading said stored mode data stored in said accumulation/storage means along scanning lines and sequentially accumulating the read data, thereby to obtain raster outputs for filling said inner regions of said polygons at each point on said scanning lines in accordance with said accumulated values of said mode data, wherein said mode data has a data length of n-bits per pixel, n being an integer, said accumulation/storage means comprises:

(a) memory means, and (b) accumulation means for reading a previously stored value of said mode data from said memory means, transforming said read mode data by newly provided mode data, accumulating said mode data and re-storing in said memory means said transformed mode data thus obtained, said memory means comprising RAMs having a storage capacity for storing mode data for one or more scanning lines, said RAMs being cleared every time said stored mode data is entirely read to provide said raster outputs for a scanned line, said apparatus for processing image data further including repetition means for sequentially repeating respective processing operations from said input to said output in compliance with the storage capacity of said memory means.

13. An apparatus for processing image data in accordance with claim 12, further comprising means for encoding values of said mode datum by assigning to two different types of said mode datum two groups of code data which are in 2's complement relation with each other, said accumulation means operable for performing transformation and accumulation of said code data.

14. An apparatus for processing image data in accordance with claim 13, wherein said output data producing means comprises:

means for reading said code data as said mode data from said memory means along said scanning lines and sequentially accumulating the code data, and comparator means for comparing said accumulated code data with prescribed reference values, said raster outputs being obtained in compliance with the results of said comparison by said comparator means.

15. An apparatus for processing image data to obtain raster output for recording images by filling inner regions of one or more polygons along a sequence of scanning lines, said apparatus comprising:

input means for inputting coordinate data of terminal points of segments forming respective sides of said polygons;

first intermediate signal generating means for generating a first intermediate signal representing a recording characteristic of each segment forming respective sides of said polygons on the basis of coordinate data of four sequential vertices in said polygon including both terminal points of said segment as two intermediate vertices thereof, said first intermediate signals including coordinates of both terminal points of said segment, mode data for said segment and first flags with respect to record start and end points of said segments, said mode data being provided for indicating whether a point on said segment is a raster start point or a raster end point with respect to said scanning lines, second intermediate signal generating means for converting said first intermediate signals to generate second intermediate signals including coordinates of record start points of said segments, the number of vertical scanning lines of a segment, a coefficient of inclination, said mode data and said first flags for every said segment, means for permuting said first or second intermediate signals along said sequence of said scanning lines, third intermediate signal generating means for providing trains of intersection points of said segments and said scanning lines from said second intermediate signals to generate third intermediate signals including positional coordinates, said mode data and second flags for respective ones of said intersection points, said second flags being adapted to indicate whether said third intermediate signals are to be further converted to give said raster output with respect to said intersection points, fourth intermediate signal generating means for converting said third intermediate signals in response to said second flags thereby to generate fourth intermediate signals including said positional coordinates and said mode data with respect to said trains of said intersection points, accumulation/storage means for accumulating said mode data for respective said segments for each record coordinate and storing accumulated mode data; and output data producing means for reading said mode data stored in said accumulation/storage means along said scanning lines and sequentially accumulating the same thereby to obtain raster outputs for filling said inner regions of said polygons in response to the results of said accumulation in respective positions on said scanning lines.

16. An apparatus for processing image data in accordance with claim 15, wherein said mode data has a data length of n-bits per pixel, n being an integer, said accumulation/storage means comprises:

(a) memory means, and (b) accumulation means for reading a previously stored value of said mode data from said memory means, transforming said read mode data by newly provided mode data, accumulating said mode data and re-storing in said memory means said transformed mode data thus obtained, said memory means comprising RAMs having a storage capacity for storing mode data for one or more scanning lines, said RAM being cleared every time said stored mode data is entirely read to provide said raster outputs for a scanned line, and said apparatus for processing image data further including repetition means for sequentially repeating respective processing from said input to said output in compliance with the storage capacity of said memory means.

17. An apparatus for processing image data in accordance with claim 16, further comprising means for encoding values of said mode datum by assigning to two different types of said mode datum two groups of code data which are in 2's complement relation with each other, said accumulation means operable for performing transformation and accumulation of said code data.

18. An apparatus for processing image data in accordance with claim 17, wherein said output data producing means comprises:

means for reading said code data as said mode data from said memory means along said scanning lines and sequentially accumulating the code data, and comparator means for comparing said accumulated code data with prescribed reference values, said raster outputs being obtained in compliance with the results of said comparison by said comparator means.

19. An apparatus for processing image data in accordance with claim 18, wherein said mode data stored in said memory means includes, in addition to modes respectively indicating whether points on said segment are in the raster starting point, raster ending point or specific point mode, an additional mode indicating a case where a point on said segment is in raster start and end point, said specific point mode being generated in said accumulation/storage means.

20. An apparatus for processing image data in accordance with claim 19, wherein said means for performing said permutation of said first or second intermediate signals includes:

a plurality of storage region of classification memory means assigned per record area in the direction of vertical scanning lines, write means for classifying said signals in response to coordinates of record start point of said segment to write the same in corresponding said storage regions, and read means for reading said signal values from said plurality of storage means in sequence of scanning.

21. An apparatus for processing image data in accordance with claim 20, wherein said classification memory means include a first classification memory means for storing data for segments in the vicinity of image regions currently being recorded and a second classification memory means for storing data for segments in regions to be subsequently recorded, said image regions to be respectively stored in said first and second classification memory means being sequentially changed with progress of said recording.

22. A method for processing image data to assign fill data values for representing record points in overlapping inner regions of a plurality of overlapped polygons in a scanning output process, comprising the steps of:

assigning mode data to identify intersections between each line segment forming each of said polygons and a plurality of scan lines used to provide a scanned output image of said polygons, storing the mode data in a memory, transforming the mode data stored in the memory by accumulating along each scan line the mode data assigned to intersections of said scan line with the line segments forming said polygons, assigning the accumulated mode data to points to be recorded along the scan line, setting a threshold value for comparison with the accumulated mode data, comparing the threshold value with the accumulated mode data, and filling record points along the scan lines in the regions of the polygons and record points at the intersections of the polygon segments with the scan lines according to a result of the comparison of the threshold value with the accumulated mode data for each of said record points.

23. A method for processing image data to assign fill data values for inner regions of a plurality of overlapped polygons as recited in claim 22 wherein said memory is a random access memory, said first assigning step is conducted as a random operation on said intersections between each line segment forming each of said polygons and said plurality of scan lines for providing random access to said memory for storing the assigned mode data therein, and comprising the further step of sequentially reading from said memory the accumulated and transformed data for each record point along each scan line.

24. A method for processing image data to assign fill data values for inner regions of a plurality of overlapped polygons as recited in claim 23 wherein said filling step comprises a step of producing raster scan data for each record point based on the sequentially read data from said memory.

25. An apparatus for processing image data to obtain raster output for recording images by filling inner regions of one or more polygons along a sequence of scanning lines, said apparatus comprising:

input means for inputting coordinate data of terminal points of segments forming respective sides of said polygons;

mode data means for providing, on the basis of said coordinate data, mode data for each of said segments to identify for points on said segment at intersections with said scanning lines a mode datum having one of a plurality of values, a first value defining a raster start mode, a second value defining a raster end mode, and a third value defining a raster start and end mode;

summation/storage means operable along each scanning line for summing values of said mode data provided for points on polygon segments intersecting said scanning line and, for each said point at an intersection of said scanning line with one of said segments, storing said summed value of said mode data; and output data producing means for reading said stored mode data stored in said summation/storage means along scanning lines and sequentially summing the read data, thereby to obtain raster outputs for filling said inner regions of said polygons at each point on said scanning lines in accordance with said summed values of said mode data.

* * * * *